(12) United States Patent
Ondruska et al.

(10) Patent No.: US 12,198,316 B2
(45) Date of Patent: Jan. 14, 2025

(54) FUSING MAP RECONSTRUCTIONS GENERATED FROM MULTIPLE BATCHES OF DATA

(71) Applicant: Lyft, Inc., San Francisco, CA (US)

(72) Inventors: Peter Ondruska, London (GB); Luca Del Pero, London (GB); Ivan Katanic, London (GB)

(73) Assignee: Lyft, Inc., San Francisco, CA (US)

( * ) Notice: Subject to any disclaimer, the term of this patent is extended or adjusted under 35 U.S.C. 154(b) by 912 days.

(21) Appl. No.: 16/917,714

(22) Filed: Jun. 30, 2020

(65) Prior Publication Data

US 2021/0407069 A1    Dec. 30, 2021

(51) Int. Cl.
*G06K 9/00* (2022.01)
*G06T 7/00* (2017.01)

(52) U.S. Cl.
CPC .. *G06T 7/0002* (2013.01); *G06T 2207/20221* (2013.01); *G06T 2207/30168* (2013.01); *G06T 2207/30252* (2013.01)

(58) Field of Classification Search
CPC ......... G06T 7/0002; G06T 2207/20221; G06T 2207/30168; G06T 2207/30252
USPC ........................................................ 382/154
See application file for complete search history.

(56) References Cited

PUBLICATIONS

Vemprala, Sai, and Srikanth Saripalli. "Monocular vision based collaborative localization for micro aerial vehicle swarms." 2018 International Conference on Unmanned Aircraft Systems (ICUAS). IEEE, 2018. (Year: 2018).*
Li, Yamin, Yong Wang, and Dianhong Wang. "Multiple RGB-D sensor-based 3-D reconstruction and localization of indoor environment for mini MAV." Computers & Electrical Engineering 70 (2018): 509-524. (Year: 2018).*
Li, Hao, and Fawzi Nashashibi. "Multi-vehicle cooperative localization using indirect vehicle-to-vehicle relative pose estimation." 2012 IEEE International Conference on Vehicular Electronics and Safety (ICVES 2012). IEEE, 2012. (Year: 2012).*
Yang, Sheng, et al. "Heterofusion: Dense scene reconstruction integrating multi-sensors." IEEE transactions on visualization and computer graphics 26.11 (2019): 3217-3230. (Year: 2019).*

* cited by examiner

*Primary Examiner* — Jonathan S Lee
(74) *Attorney, Agent, or Firm* — Lee Sullivan Shea & Smith LLP

(57) ABSTRACT

Examples disclosed herein may involve a computing system that is operable to (i) receive image data captured from one or more devices, (ii) based on the image data, generate at least two batches of data corresponding to an area of a global map, wherein each batch of data comprises (a) a respective group of images from the received image data, and (b) one or more common images comprising one or more common visual features, (iii) generate a respective reconstruction of the area of the global map for each of the at least two batches of data, and (iv) fuse the respective reconstructions of the area of the global map using the one or more common visual features from the one or more common images.

20 Claims, 12 Drawing Sheets

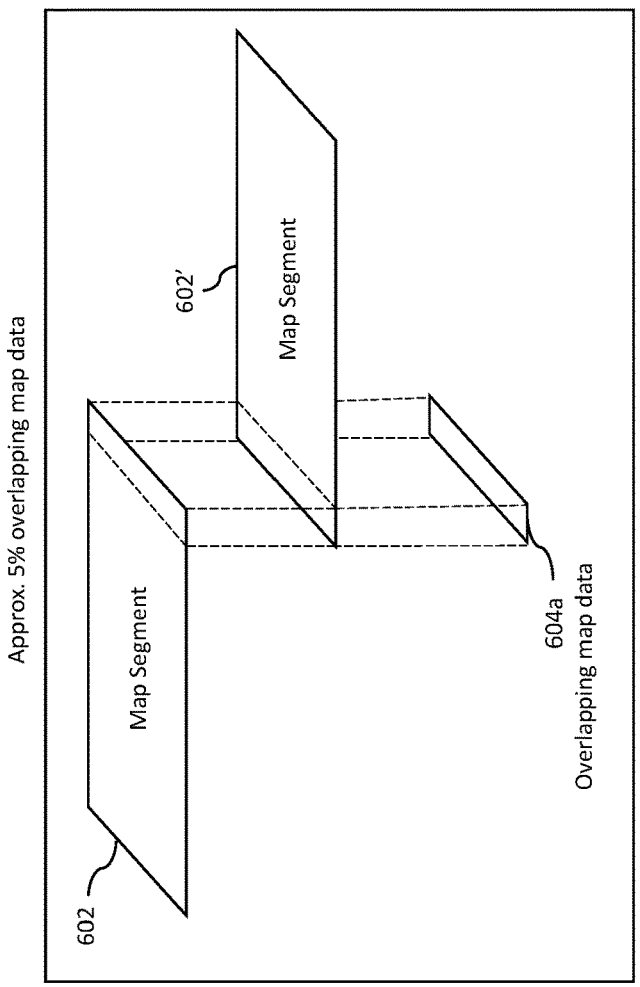
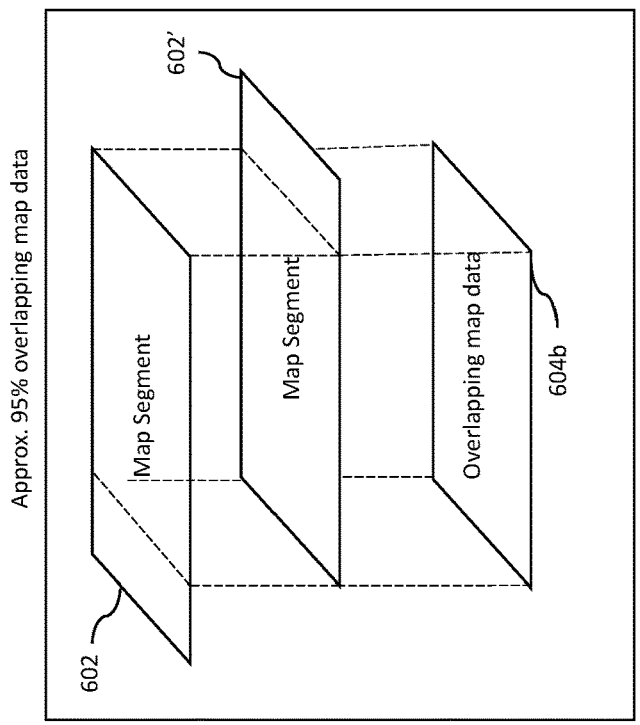
FIG. 7b

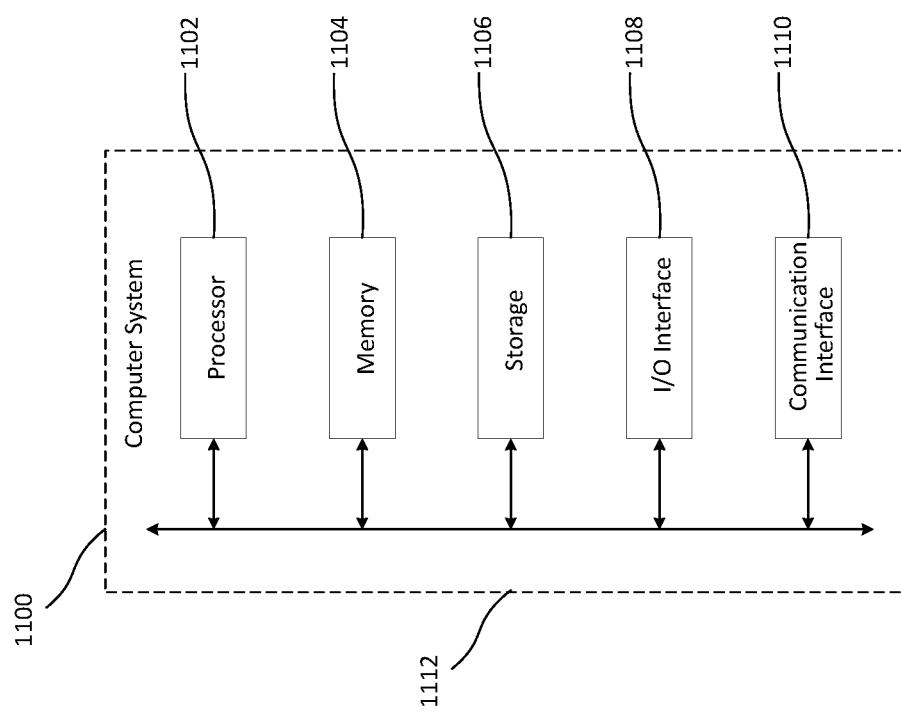

FUSING MAP RECONSTRUCTIONS GENERATED FROM MULTIPLE BATCHES OF DATA

FIELD OF THE INVENTION

The present disclosure relates to a method for creating and/or updating a large-scale global map. More particularly, the present disclosure relates to improving the quality of maps using techniques to validate and/or align data used to create or update such maps.

BACKGROUND

Various computer vision techniques have been developed, particularly three-dimensional reconstruction methods, in order to build accurate maps of environments.

In particular, a variety of techniques and algorithms have been developed to enable three-dimensional reconstruction of environments from various input data. Some techniques, for example, use input data from specialized equipment to capture information about an environment, for example using LIDAR, microwave, and/or ultrasound sensors.

Some techniques for three-dimensional reconstruction, however, rely on optical imaging devices alone, such as camera sensors. One of the advantages of using optical imaging techniques is that they do not require special, and often expensive, devices or equipment. In particular, some of these techniques only require image data of the environment to be obtained from standard camera devices, such as those image sensors available on typical "smartphones" or mobile phones, in order to be used as input for three-dimensional reconstruction of the environment observed in the image data.

A well-known computer vision technique for three-dimensional reconstruction is termed "Structure from Motion" (hereafter referred to as "SfM"). Given a set of images of an environment that are acquired from different observation points, SfM techniques can be used to recover the pose of the camera for each input image and develop a three-dimensional reconstruction of the environment from information derived from the collection of images—sometimes outputting scene/environment information in the form of a point cloud. Often, SfM techniques are applied as part of a "pipeline" or sequence of techniques where each part of the pipeline can tackle a different problem.

There are numerous approaches to estimate SfM from multiple images. Thanks to recent progress in image matching and optimization, it is now possible to compute a large-scale three-dimensional reconstruction of an environment from millions of input images of that environment.

SUMMARY

In one aspect, the disclosed technology may take the form of a first method that involves (i) receiving image data and corresponding secondary sensor data, (ii) generating a reconstruction of a map from the image data, where the reconstruction comprises sequential pose information, (iii) determining constraints from the secondary sensor data, and (iv) validating the reconstruction of the map by applying the determined constraints from the secondary sensor data to the determined sequential pose information from the reconstruction of the map and determining whether the sequential pose information fails to satisfy any of the constraints determined from the secondary sensor data.

In example embodiments, this first method may further involve, if the constraints are satisfied, updating a global map with one or both of (a) the image data or (b) the reconstruction of the map.

Further, in example embodiments of the first method, the reconstruction of the map may comprise image data and pose information associated with the capture of the image data.

In these example embodiments of the first method, the received image data may have been captured by an image sensor and the secondary sensor data may have been captured by a second sensor.

Further yet, in example embodiments of the first method, the secondary sensor data may comprise data output from one or more of (a) an IMU sensor, (b) a GPS sensor, (c) an accelerometer, (d) a gyroscope, or (e) a depth perception sensor.

Still further, in example embodiments of the first method, the secondary sensor data may comprise trajectory data output by a gyroscope, and validating the reconstruction of the map may comprise comparing the trajectory data output from the gyroscope to the sequential pose information and determining whether the sequential pose information aligns with the trajectory data output from the gyroscope.

In other example embodiments of the first method, the secondary sensor data may comprise trajectory data output from an accelerometer, and validating the reconstruction of the map may comprise comparing the trajectory data output from the accelerometer to the sequential pose information and determining whether the sequential pose information aligns with the trajectory data output from the accelerometer.

In still other example embodiments of the first method, the secondary sensor data may comprise a sequence of gravity vectors, where the determined constraints from the secondary sensor data may comprise the sequence of gravity vectors, and where validating the reconstruction of the map may comprise (a) deriving a reconstructed sequence of gravity vectors from the sequential pose information, and (b) determining whether the reconstructed sequence of gravity vectors aligns with the sequence of gravity vectors from the secondary sensor data.

Moreover, in example embodiments of the first method, the secondary sensor data may comprise kinematic information, where the determined constraints from the secondary sensor data may comprise one or more kinematic constraints, and where validating the reconstruction of the map may comprise determining whether the sequential pose information satisfies the one or more kinematic constraints.

In these example embodiments of the first method, the one or more kinematic constraints may include a maximum velocity threshold.

Further, in these example embodiments of the first method, the first method may further involve deriving kinematic information from a relationship between the sequential pose information or a relationship between a sequence of images from the image data.

In additional example embodiments of the first method, the image data and the secondary sensor data may be captured at substantially the same time.

In further example embodiments of the first method, the reconstruction of the map may comprise a visualization of an area in three dimensions and may comprise one or more visual landmarks.

In other example embodiments of the first method, the reconstruction of the map may be generated by applying a structure from motion technique to the image data.

In another aspect, the disclosed technology may take the form of a second method that involves (i) receiving one or more images related to a global map having a plurality of overlapping map segments, where each of the plurality of overlapping map segments corresponds to an area of the global map, and where each of the plurality of overlapping map segments overlaps with one or more neighboring map segments, (ii) based on a preliminary location determination for the one or more images, identifying at least a first overlapping map segment of the plurality of overlapping map segments that corresponds to the one or more images, (iii) generating a reconstruction of the first identified overlapping map segment based on the one or more images, and (iv) fusing the generated reconstruction of the first identified overlapping map segment together with the first identified overlapping map segment's one or more neighboring map segments based on overlapping map portions between the generated reconstruction and the first identified overlapping map segment's one or more neighboring map segments.

In example embodiments, this second method may further involve (i) determining that the generated reconstruction meets a quality threshold for the global map, and (ii) based on the determining, updating the global map with the reconstruction.

In these example embodiments of the second method, the quality threshold for the global map may be determined based on an existing quality of the global map.

Further, in example embodiments of the second method, generating the reconstruction of the first identified overlapping map segment based on the one or more images may comprise generating a reconstruction of the first identified overlapping map based on the one or more images as well as visual features and pose data generated from the global map.

In these example embodiments of the second method, generating the reconstruction of the first identified overlapping map segment based on the one or more images as well as visual features and pose data generated from the global map may comprise performing optimization of the pose data using one or more reconstruction constraints comprising one or more of (a) geographical radius, (b) image size, (c) number of images in each segment, or (d) number of common data points.

Further, in these example embodiments of the second method, the common data points may comprise one or more of (a) one or more landmarks or (b) one or more extracted visual features.

Further yet, in these example embodiments of the second method, fusing the generated reconstruction together with the first identified overlapping map segment's one or more neighboring map segments based on overlapping map portions between the generated reconstruction and the first identified overlapping map segment's one or more neighboring map segments may comprise aligning one or more common data points in the first identified overlapping map segment.

Still further, in example embodiments of the second method, the global map is generated using one or more images together with one or more of (a) global positioning system data, (b) inertial measurement unit sensor data, or (c) accelerometer data.

In other example embodiments of the second method, the one or more images may be gathered at various times and in varying environmental conditions.

In further example embodiments of the second method, the reconstruction of the first identified overlapping map segment may comprise a visualization of the area in a 3D space.

In additional example embodiments of the second method, the first identified overlapping map segment may have at least a 50% overlap with the first identified overlapping map segment's one or more neighboring map segments.

In yet another aspect, the disclosed technology may take the form of a third method that involves (i) receiving image data captured from one or more devices, (ii) based on the image data, generating at least two batches of data corresponding to an area of a global map, where each batch of data may comprise (a) a respective group of images from the received image data, and (b) one or more common images comprising one or more common visual features, (iii) generating a respective reconstruction of the area of the global map for each of the at least two batches of data, and (iv) fusing the respective reconstructions of the area of the global map using the one or more common visual features from the one or more common images.

In example embodiments, this third method may further involve updating the global map with one or more of (a) one or more of the at least two batches of data when each of the respective reconstructions of the area meets a predetermined quality threshold requirement, (b) one or more of the respective reconstructions of the area of the global map, or (c) the fused respective reconstructions of the area of the global map.

Further, in example embodiments of the third method, generating the respective reconstruction of the area of the global map for each of the at least two batches of data may comprise generating the respective reconstruction of the area of the global map for each of the at least two batches of data independently in parallel in order to output the respective reconstructions substantially simultaneously.

Further yet, in example embodiments of the third method, fusing the respective reconstructions of the area of the global map may comprise generating a reconstruction of the area of the global map using the at least two batches of data.

Still further, in example embodiments of the third method, generating the respective reconstruction of the area of the global map for each of the at least two batches of data may comprise optimizing the respective constructions based on visual features and pose data generated from the image data.

Even further, in example embodiments of the third method, each of the at least two batches of data may comprise one or more poses generated from the image data.

In other example embodiments of the third method, the image data may comprise one or more image data collects.

In still other example embodiments of the third method, generating the at least two batches of data may comprise applying a set of constraints that may comprise one or more of (a) geographical radius, (b) image size, (c) number of images in each batch, or (d) number of common images.

In further example embodiments of the third method, the one or more common visual features may comprise one or more landmarks represented in the image data.

In still further example embodiments of the third method, the image data may be gathered at various times and in varying environmental conditions.

In additional example embodiments of the third method, the image data may be provided by one or more vehicles over one or more trajectories enabling each of the at least two batches of data to comprise a variety of image data corresponding to the same area of the global map.

Moreover, in example embodiments of the third method, each of the at least two batches of data may comprise a visual representation of one or more trajectories of the one or more devices.

In other example embodiments of the third method, the third method may further involve performing bundle-adjustments on the respective reconstructions to optimize pose data and localization landmarks between the at least two batches of data.

In still other example embodiments of the third method, each of the respective reconstructions of the area of the global map may comprise a visualization of the area in a 3D space.

In a further aspect, the disclosed technology may take the form of a computing system comprising at least one processor, a non-transitory computer-readable medium, and program instructions stored on the non-transitory computer-readable medium that are executable by the at least one processor such that the computing system is configured to carry out one or more functions of one or more of the aforementioned methods.

In yet another aspect, the disclosed technology may take the form of a non-transitory computer-readable medium comprising program instructions stored thereon that are executable to cause a computing system to carry out one or more functions of one or more of the aforementioned methods.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF DRAWINGS

Embodiments will now be described, by way of example only and with reference to the accompanying drawings having like-reference numerals, in which:

FIGS. 7a and 7b show illustrations of how two map segments when overlaid to correspond to common absolute positions upon a reference dimension (or within a global map) contain areas within both map segments that overlap in the global map;

FIG. 11 shows a standard illustration of a computer system for use with described embodiments.

Figure 1:
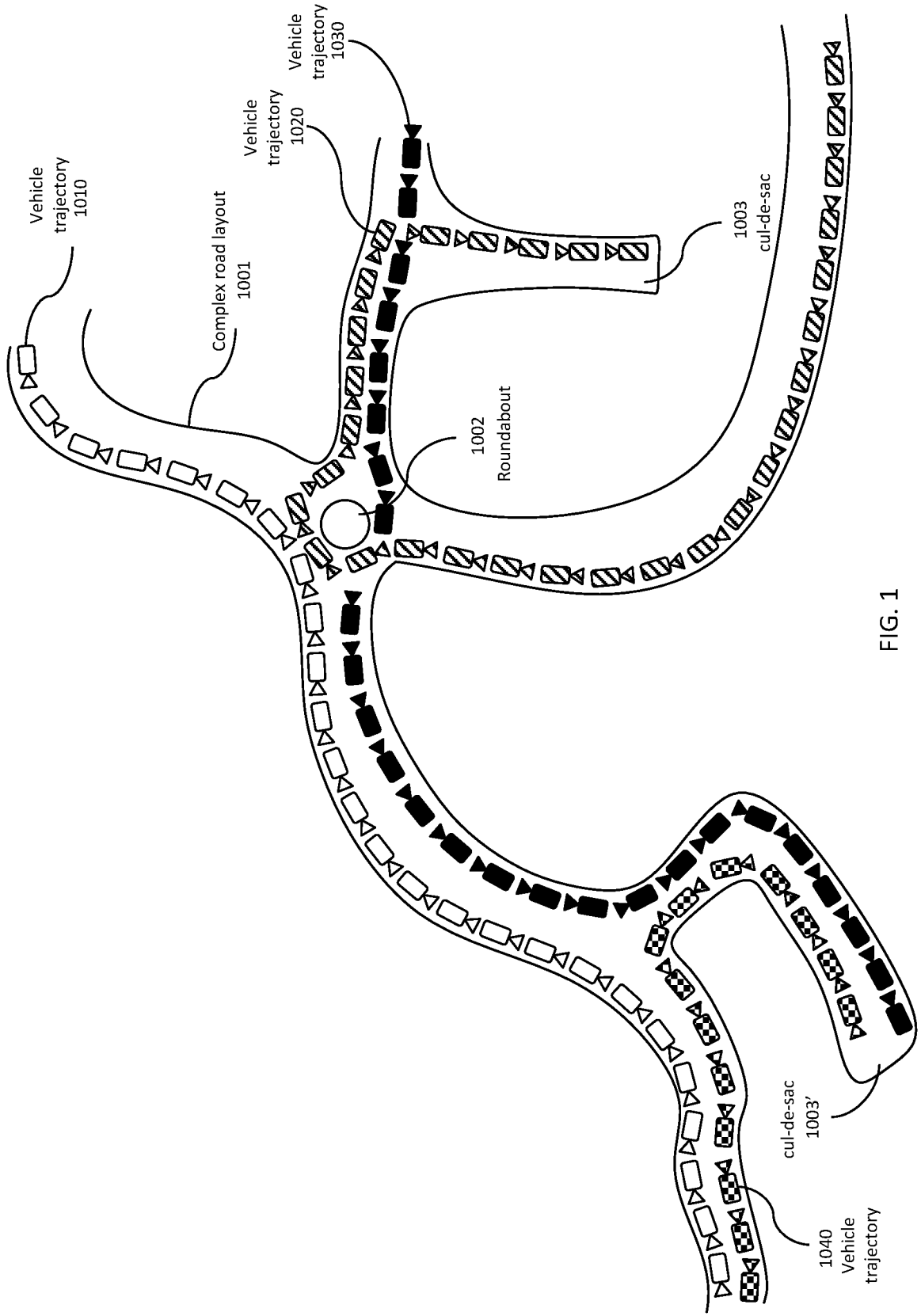
FIG. 1 shows multiple vehicles capturing large amounts of data in an environment being mapped, each vehicle having a trajectory through the environment and capturing a sequence of data over the trajectory illustrated by a sequence of camera positions along each trajectory (a "collect")

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

FIG. 1 illustrates a typical environment to be mapped, having a relatively complex road layout 1001 including, for example, roundabouts 1002 and cul-de-sacs 1003, 1003' and multiple sensor platforms (illustrated by sequences of camera image capture positions defining each vehicle trajectory 1010, 1020, 1030, 1040) traversing the environment 1000. In the described embodiment, the sensor platforms are vehicles and the environment is a road network. Most such typical environments 1000 are non-trivial to map substantially comprehensively, due to the complicated layouts of typical road networks 1001. Each vehicle used to map the environment 1000 traverses the environment 1000 along a trajectory 1010, 1020, 1030, 1040 and collects data for mapping as a sequence of images or image data as each vehicle travels along its trajectory 1010, 1020, 1030, 1040. These sequences of images are typically referred to as "collects."

The map area illustrated in FIG. 1 is a simplification of a typical road network 1001 and it will be understood by the reader that road networks in real life are typically variable in complexity and, further, the numbers of possible and actual trajectories taken across the road network will be diverse and similarly complex. Thus, the selection of which trajectories and collects to use to build a map is itself a problem that requires a solution when building a map using data from vehicles.

Figure 2:
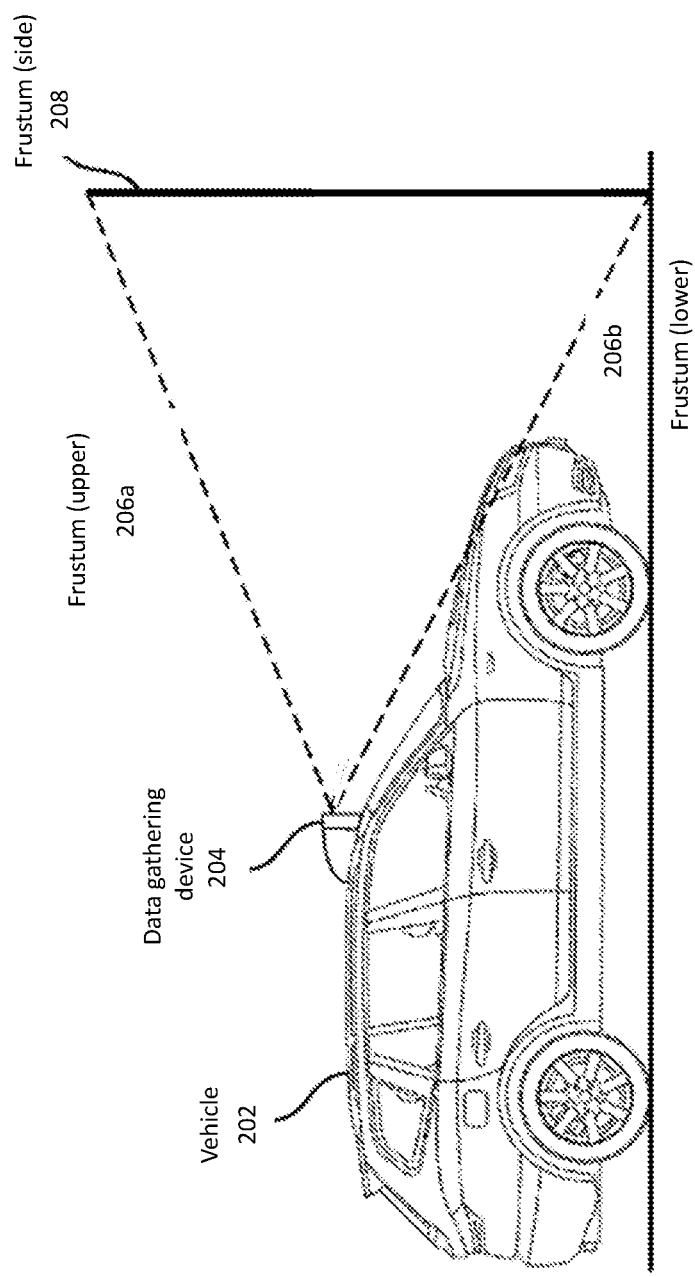
FIG. 2 shows an illustration of a typical vehicle having an imaging sensor mounted thereupon and capturing image data in a forward-facing orientation typically in the same direction as the vehicle is travelling.

FIG. 2 depicts an example system for gathering raw input data for SfM techniques/map generation. In this example, a vehicle 202 is shown with a data gathering device 204. Vehicle 202 may be one of plurality of vehicles that can be used to gather data of an environment. Using a large number of vehicles means that a large amount of data can be obtained across the plurality of vehicles and, more importantly when the data being collected is image data, the gathered data across vehicles can provide a number of different observation perspectives/observation conditions for each area of the environment to be mapped.

Although the data gathering device 204 is positioned on top of the vehicle 202 in the example of FIG. 2, the data gathering device 204 may alternatively be positioned inside the vehicle 202. For example, the data gathering device 204 may be any of: a dedicated camera with data connection, a mobile phone, an augmented reality device, a wearable device, a laptop computer, a tablet computer, etc. with a means for capturing image data, such as a camera. The data gathered by the data gathering device 204 may be in the form of static images, a sequence of static images or a video stream. The data gathering device 204, or vehicle 202, may also include optional sensors such as accelerometers, gyroscopes, a compass, an inertial measurement unit (IMU), a global positioning system (GPS) unit, or depth perception that can gather other data which is associated with, or correlated with, the main data (e.g., image data) gathered by the data gathering device 204. Alternatively, instead of a vehicle, the data gathering device 204 may be carried by a person or attached to/incorporated in a bicycle, electric scooter, or other moving platform.

In the example of FIG. 2, the data gathering device 204 gathers each image having a certain field of view, which is illustrated by the indicated frustrum 206a, 206b, 208. In addition, pose data can be associated with each image captured. The vehicle 202, as it travels along a path/trajectory, thus captures a sequence of images at intervals (typically as frames in a video sequence, so for example at 30 frames per second or as dictated by the software or hardware configuration of the data gathering device 204).

In some embodiments, multiple data gathering devices 204 (e.g., sensors) may be mounted on the vehicle 202. The data gathering devices 204 might be a group of like sensors, for example a set of image capture devices arranged to capture a 360 degree view of the vehicle 202 surroundings, or a suite of sensors, for example a set of image sensors as well as a LIDAR and a satellite positioning system. Secondary sensors may gather additional data that is synchronized or corresponds with the image/video data.

Figure 3:
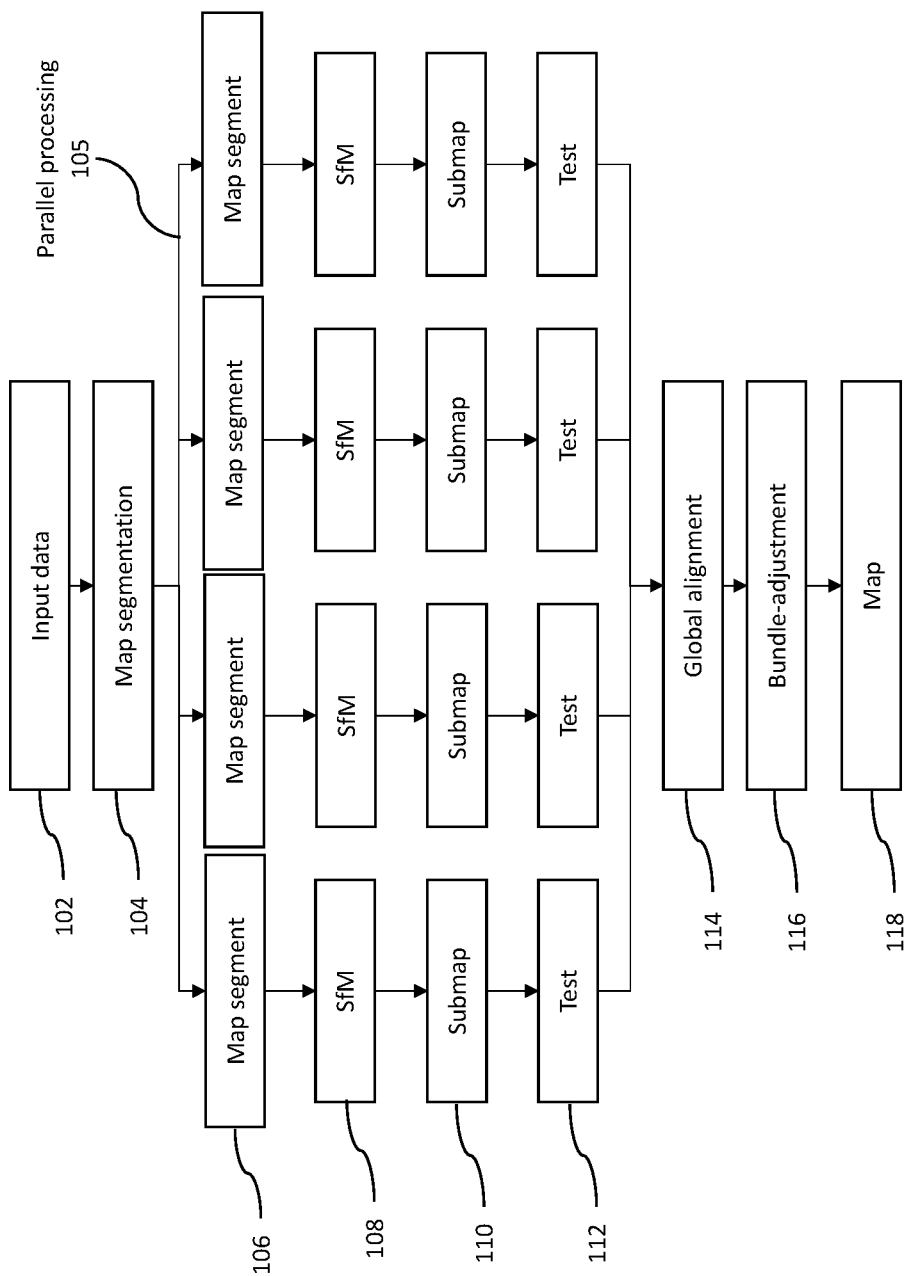
FIG. 3 shows an illustration of how input data can be split into batches in order to perform parallel processing on each batch of input data before the output of the parallel processing is recombined and aligned.

FIG. 3 illustrates a pipeline flowchart of an example embodiment where a map 118 is being constructed from input data 102. It will be understood by the reader that the pipeline flowchart may share a number of common features with existing SfM pipelines, such as receiving input data 102, global alignment 114 and bundle-adjustment techniques 116.

In relation to FIG. 3, the process shown involves the following steps:

Initially, input data 102 is gathered from data sensors (the data sensors being those mounted on or part of a vehicle traversing an environment to be mapped), and in this embodiment the input data 102 includes image sensor data. In other embodiments, input data 102 can further include other sensor data (in addition to the image sensor data) such as satellite positioning data and/or inertial measurement data which is gathered and correlates with/is correlated with the aforementioned image data/image sensor data, for example using the internal clock (where one device gathers all of the data using in-built sensors, for example if the device is a smartphone or mobile phone), or time stamp metadata for the input data 102.

In the next step of the flowchart, map segmentation 104 is applied to the input data 102 in order segment the input data 102 into batches of data corresponding to segments of a map 106. The segments of the map 106 can be predetermined, for example by dividing the planned map of the environment to be mapped into zones or areas, e.g. grid sections, or the segments of the map 106 can be dynamically determined and/or adjusted based on factors such as complexity, quantity of map data or category (e.g. fast road; intersection; junction). In this embodiment, the segments of the map 106 are chosen/set to overlap to a large degree, of around 50% with each "neighboring" map segment, thus some input data 102 will be shared between multiple map segments.

For each map segment 106, in this embodiment, parallel processing 105 may be applied to allow for the input data 102 to be updated into the global map 118 with substantially minimal delay depending on available computing power. For each respective map segment 106, structure from motion (SfM) techniques/algorithms 108 are used to reconstruct a three-dimensional (3D) map for the respective map segment using the input data 102 for the respective map segment 106 to create a respective submap 110.

In example embodiments, the global map is not associated with a particular reference device, vehicle, robot, sensor or collect, but instead is a global reference with a variety of collects, samples, sensor input data or map segments from a plurality and/or variety of devices, vehicles, robots or sensors obtained at different times, places and environmental conditions, which may be continuously updated.

In some embodiments, testing 112 may then optionally be performed for the submaps 110. Examples of testing include validation or verifying the reconstructed map data for each map segment against the input data 102, where the input data can include image data and/or complementary secondary data.

Following the creation and potential testing of the multiple submaps 110 for the map segments 106, a process of global alignment 114 is performed to align each of the submaps 110 for the overlapping map segments 106 by using the overlapping portions of the submaps 110.

After the submaps 110 have been aligned, a process of bundle adjustment 116 may be performed and a map 118 (e.g., a global map) may be updated, output or created (as appropriate).

Figure 4:
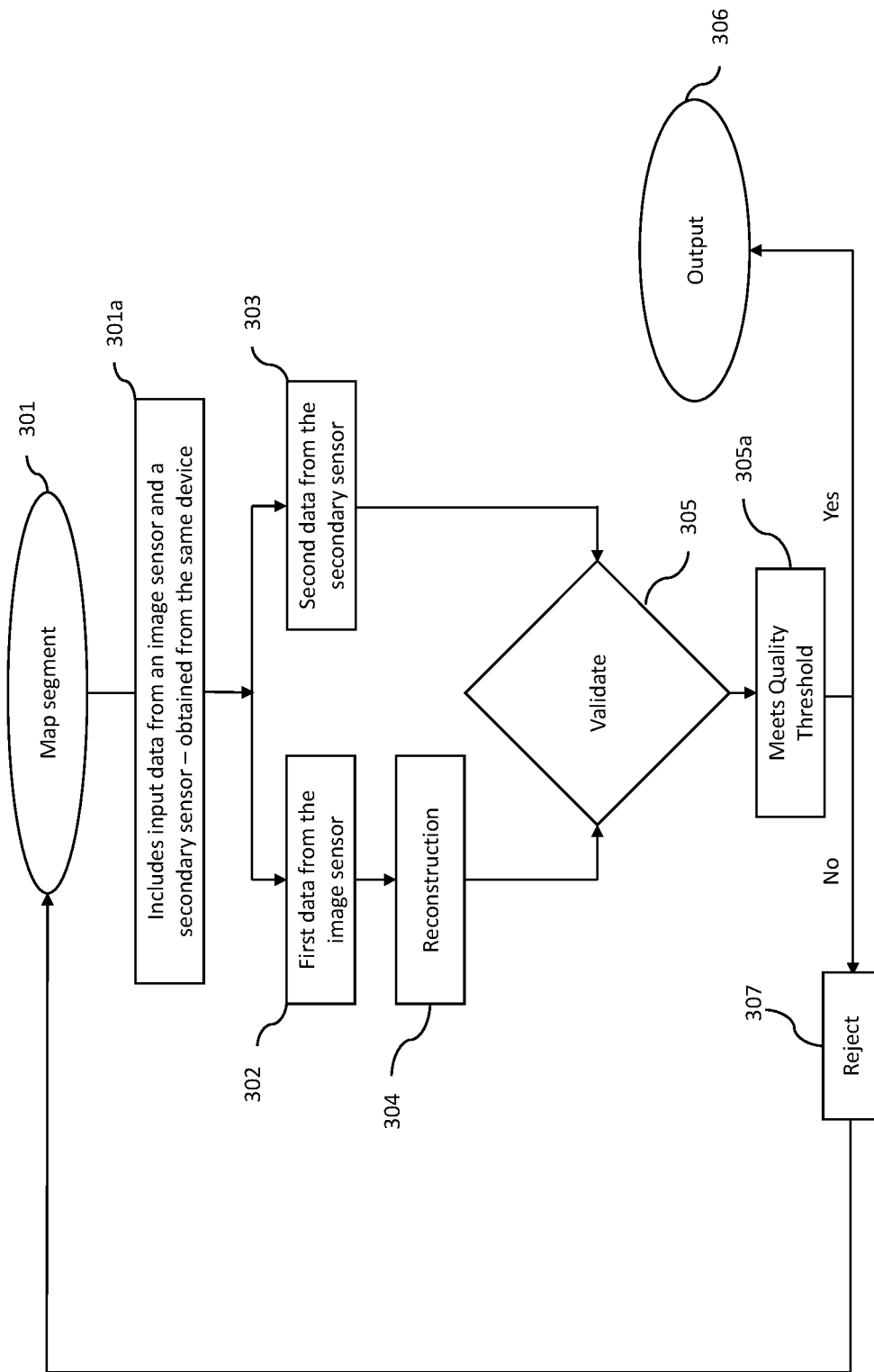
FIG. 4 is a flowchart showing an example of how each map segment can use input data from at least two types of sensors, obtained at substantially the same time, to both reconstruct and validate the reconstructed map that can be derived from the sensors in order to determine whether to incorporate new map data into a global map.

Referring to FIG. 4, an embodiment showing a validation process that can be used for testing will now be described. In the embodiment of FIG. 4, data for a segment of map data 301 may be provided by one or more vehicles (or new data for an existing map segment of a global map is provided). The segment of map 301 can either represent a new geographic location/area/section of the environment to add to a global map (of an environment), or an existing geographical locale/zone/area of the global map to be updated. Optionally, the data for the segment of map 301 comprises a new set of data for an existing area of the global map.

As shown at 301a, the data for the map segment 301 may include input data from one or more image sensors (on the one or more vehicles), which capture a first dataset 302 comprising a plurality of sequential images or a stream of video data, and perhaps also input data from one or more secondary sensors, which capture a second dataset 303. A vehicle, for example a car, can provide a robust and convenient means for capturing data which may be used in a global map (when provided with an image capture apparatus such as a camera on a mobile phone). In some embodiments, any type of robotics such as a mobile robot, a manned or unmanned ground robot, autonomous robots, etc., may be used to traverse an environment and obtain sensory data. Many vehicle operators are also users of maps, and hence many vehicles travel to physical areas around which map data is useful. By coupling one or more types of sensors operable to collect data for at least two datasets 302, 303, (corresponding) relevant map source data may be gathered and/or verified. Monitoring the trajectory of the sensors, and so by extension the vehicle or platform on which the sensors are mounted, can provide a further level of data useable for verification of any new map reconstructed. In addition to image data obtained by one or more image sensors, the secondary sensor dataset 303 can also be obtained to verify or validate any new map reconstruction data. Each dataset may comprise corresponding or synchronized data 302, 303 gathered by one or more sensors on the same vehicle.

As previously indicated, most data gathering devices comprise multiple sensors in addition to an image sensor, and potentially advantageously, the dataset 303 gathered by an additional sensor can be used to cross check and verify 305 any reconstructions 304 created based on the collected image dataset 302.

In addition to the examples previously mentioned, data for a map or any other representation of a geographic area may be collected using a range of electronic devices and sensors, for example by a user/vehicle taking pictures using a camera and uploading (automatically or manually) the captured images 302 to a centralized database, or using a mobile phone to capture a sequence of images 302 as a user walks along, or a vehicle that drives along a street (which data 302 can be transmitted to a server or other devices). Some or all of this image data 302 may provide a useful addition to the global map, for example by providing data in relation to previously unexplored areas of an environment or by updating a map after there has been a change in a known area such as a new building being erected or new street furniture, etc., or to improve the quality of one or more segments or areas of the global map. Primarily, the reconstruction of the map section(s) is performed using image data. However, in order to retain a predetermined quality standard for the global map, verification may be performed before the new data and/or reconstruction is accepted as part of the global map.

Using SfM techniques, the captured image data 302 can be used to generate a 3D reconstruction 304 of the area or environment captured. In some embodiments, the captured image data 302 is processed by SfM pipelines to reconstruct a map corresponding to a geographic area. In some embodiments, the reconstruction 304 of the area comprises a visualization of the area in a 3D space. 3D reconstruction can provide a versatile and accurate means for a user or system to explore the map in a virtual environment. The map is a depiction of a whole area or a part of an area/environment which emphasizes the relationships between elements in space such as objects, landmarks, road signs, road names, or location. In some embodiments, a road map may display transport links and include points of interest, such as prominent buildings, tourism sites, recreational facilities, and airports. In some embodiments, sequential SfM may be implemented as a photogrammetric imaging technique that can be used with the described embodiments in order to reconstruct 304 poses of image data streams 302.

In some embodiments, generated map segments and/or batches can be filtered based on the success of SfM as part of the validation step 305. This filtering process can be done by, for example, automatically detecting inconsistency in reconstruction or by implementing a semi-automatic method with a human-in-the-loop.

Once the area is reconstructed 304, sequential pose information that corresponds to the original image data 302 is derived from the reconstruction or the image data. This may also be seen as estimating the orientation and/or positions (or poses information) for image frames 302, or point of views, that were taken in order to create the 3D reconstruction 304. In doing so, an estimation of the pose data relating to the original image data 302 can be reconstructed based on the 3D reconstruction of the area in the validation step 305.

As with any large dataset there will undoubtedly be a percentage of broken or corrupt data. As a result, the SfM pipeline will not always construct a workable map of the captured environment for some image data. Therefore, new data 302, 303 that corresponds to an area, or a map segment 301, needs to be validated 305 before incorporating or updating parts of a global map 306. In some cases, the new data 302, 303 is only incorporated in the global map 306 if it satisfies a predetermined quality threshold 305a. If large amounts of data are gathered, the predetermined quality threshold 305a can be relatively high in order to add to the map 306 only the highest quality data.

The reconstructed map data, and particularly reconstructed pose information, may be checked (validated) 305 frame-by-frame against the corresponding second data gathered by the second sensor to assess the quality of the reconstruction 304 and input data 302 as part of the validation 305. The segment of map data is only considered an output 306 for entry into to the global map when the data is determined to be at a predetermined level of accuracy 305a, for example, 99% consistent with the second data 303 (or with information derived from the second data 303) in the validation step 305.

Verification or validation 305 may be provided using a second set of data 303 as a set of constraints for the image data. In some examples, the second data relates to or correlates to the first data 302. For example, when an image is captured from a sensor where this sensor is a camera on a mobile phone, each image may have corresponding secondary sensor data 303. In such a case, the secondary sensor data 303, may include information relevant to the image data 302. Alternatively, other sensors in the same device, e.g. the mobile phone, may capture data in parallel with the image capture and the data from these sensors 303 can be used. For example, the secondary sensor data 303 may relate to the image pose, or orientation of the image in relation to a predetermined reference vector. Alternatively, the secondary sensor data 303, may be corresponding gravity vectors, satellite position, velocity, acceleration, height, rotation, or time stamps.

Therefore, once at least a portion of the reconstruction 304 (the reconstruction comprising one or more landmarks determined by the visual data or a map) of the first dataset 302 is prepared, data from the reconstruction 304 may be compared with associated secondary sensor data 303, for the data 302 used to generate the reconstruction 304. If the map reconstructed from the image data 302 was reconstructed 304 in a way which was incompatible with the associated secondary data 303, for example the image data 302 appears to be orientated in a way that contradicts the known orientation of the camera when the image was taken as indicated by the secondary sensor data 303, or there appears to be an incompatibility between sequential images (for example, certain sequential images are inconsistent or inaccurate), then the image data is determined to be incorrect at block 305 and can be disregarded depending on the required accuracy of the global map 305a. Rather than incorporate new data into the global map 306 that might be inconsistent, inaccurate, or erroneous, instead this new data is rejected 307, and further data or alternative data can be gathered and used in place of the rejected data.

Thus, updating the global map 306 with the segment of map data will only occur when the validation step 305 meets a predetermined threshold 305a. In other words, the global map will only be updated when parameters of the first data and second data align.

If the image data from the first dataset 302 was reconstructed 304 in a way which correlates or aligns with any secondary sensor data 303, for example if the reconstruction 304 corresponds with the known orientation of the camera when the image data 302 was captured, then in at least one embodiment the image data 302 may be assumed as correct. Therefore, the global map may be expanded to include this new data 306. The degree of accuracy required 305a, when considering whether the reconstruction 304 conforms to the requirements of the secondary sensor data 303 may be set as a predetermined value according to the required accuracy of the global map. As an example, the constraints introduced by the secondary data may relate to a percentage difference which should met or satisfied in order to be considered as a validated map segment.

In some embodiments, one or more regions of an existing global map may comprise data of a lower accuracy than a predetermined value, where the predetermined value can be set to signify an acceptable level of quality. In such cases, the one or more regions that have data of quality level lower than the acceptable level of quality may necessitate a capture of new, more accurate map segment data 301 (e.g., image data) which can be verified or validated 305 using the method described herein. The new map segment data 301 may replace the map data of an existing region of the global map (which may also be referred to as an area, segment, section, zone, or portion of the global map) or be used to augment the existing data for the relevant region of the map. In this situation, the quality threshold can be set at the quality of the corresponding map segment that currently exists in the global map. Thus, any new map reconstruction 304 is incorporated if better than the map segment that currently exists in the global map.

In example embodiments, maps or sections of a map may be dynamic and/or interactive with integration of an automatic or a semi-automatic system. In a semi-automated system, manual input may be used to adjust, correct, or update sections or whole of the map. In some embodiments, the map may be viewed using a user interface and may be shown as a variety of forms such as a topological map in the form of a schematic diagram, a multi-layer map, or a single corrected and substantially optimized global map or section of the map. The term global map can be used to refer to a large-scale map which is built by combining a number of smaller maps or map segments.

In an embodiment, the second dataset 303 may be captured by an IMU sensor. By using an IMU sensor, each image frame in the first dataset 302 will have an associated and fixed gravity vector that can be determined from the corresponding data in the second dataset 303, the vector being relative to the (normal/expected) direction of gravity, thus representing the true orientation of each image frame when the image dataset 302 was captured. Optionally, second dataset 303 can include sensor data captured by other secondary sensors, such as an accelerometer, a gyroscope, and/or a depth perception sensor. The one or more secondary sensors may be adapted for electronic communication with an image sensor and as such provide corresponding secondary data 303 which can be used as part of the validation process 305. By gathering data at different times of day and/or in different environmental conditions, a more comprehensive dataset may be gathered which is representative of a range of different environmental conditions. In this example embodiment, the data obtained from the same time-span and vehicle is used for map segment reconstruction.

Figure 5:
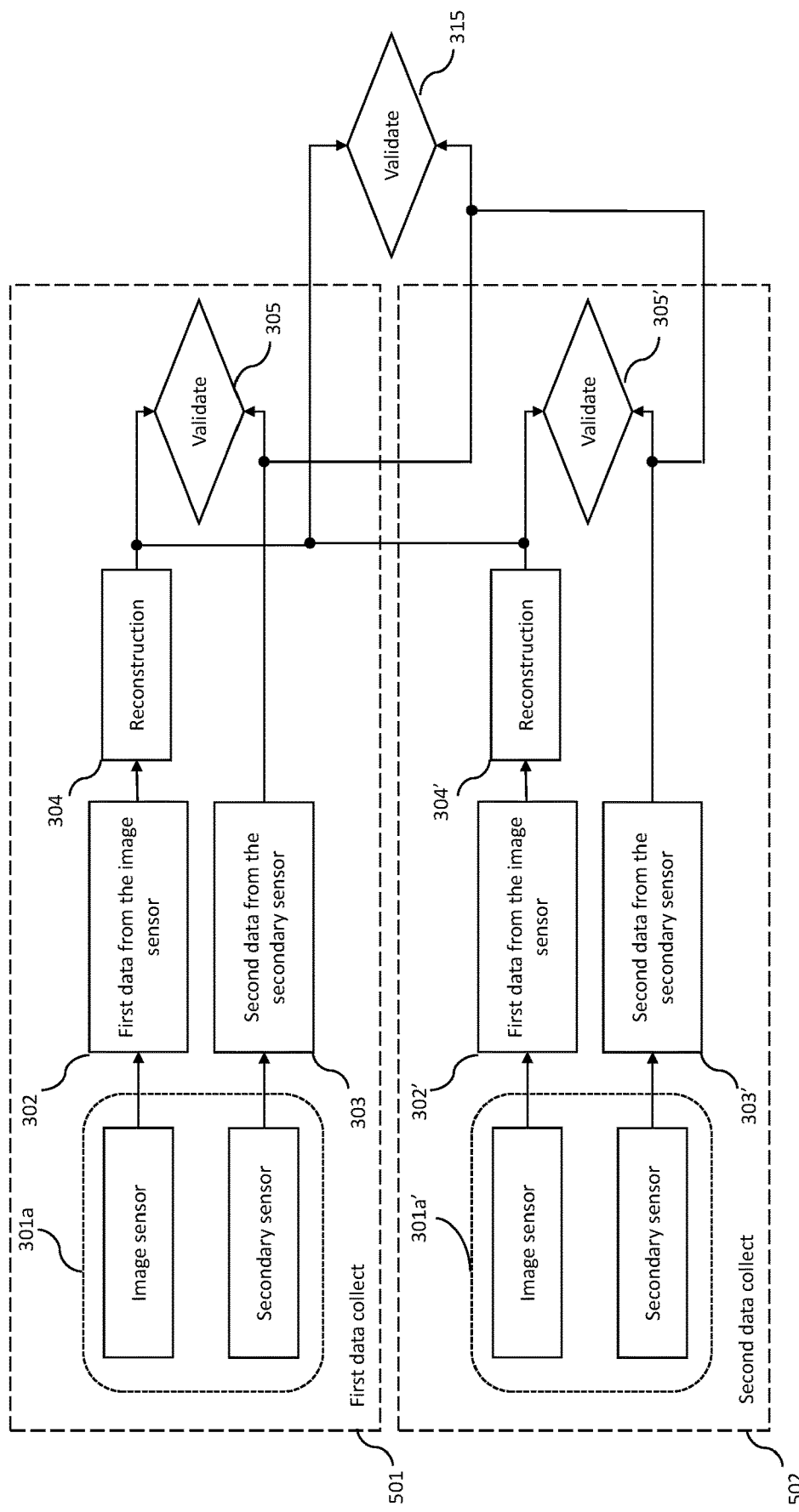
FIG. 5 illustrates two collects of data each collecting corresponding data from two sensors into a dataset for use to reconstruct a map and validate that reconstruction.

In other embodiments, as shown in FIG. 5, multiple data collects 501, 502, each based on input data from a respective set of sensors as shown at 301a, 301a', are used for updating the global map. Although only two data collects 501, 502 are shown, it should be appreciated that a plurality of collects can be gathered. As in other described embodiments, the first dataset 302, 302' from an image sensor can be used to reconstruct map data 304, 304', and the corresponding second dataset 303, 303' obtained from a secondary sensor can be used to validate the map. As shown as in FIG. 5, data obtained from a first data collect 501 can be used to validate its corresponding constructed map segment 305 while data obtained from a second data collect 502 can be used to validate its corresponding constructed map segment 305'. In some embodiments the combination of the first data collect 501 and second data collect 502 can also be used to validate inter-trajectory data and/or intra-trajectory data between collects 315. Thus, it can be understood that the map segment as termed herein can either be constructed using the first data collect 501 or the second data collect 502 or a combination of part or all of both first and second data collects.

Figure 6:
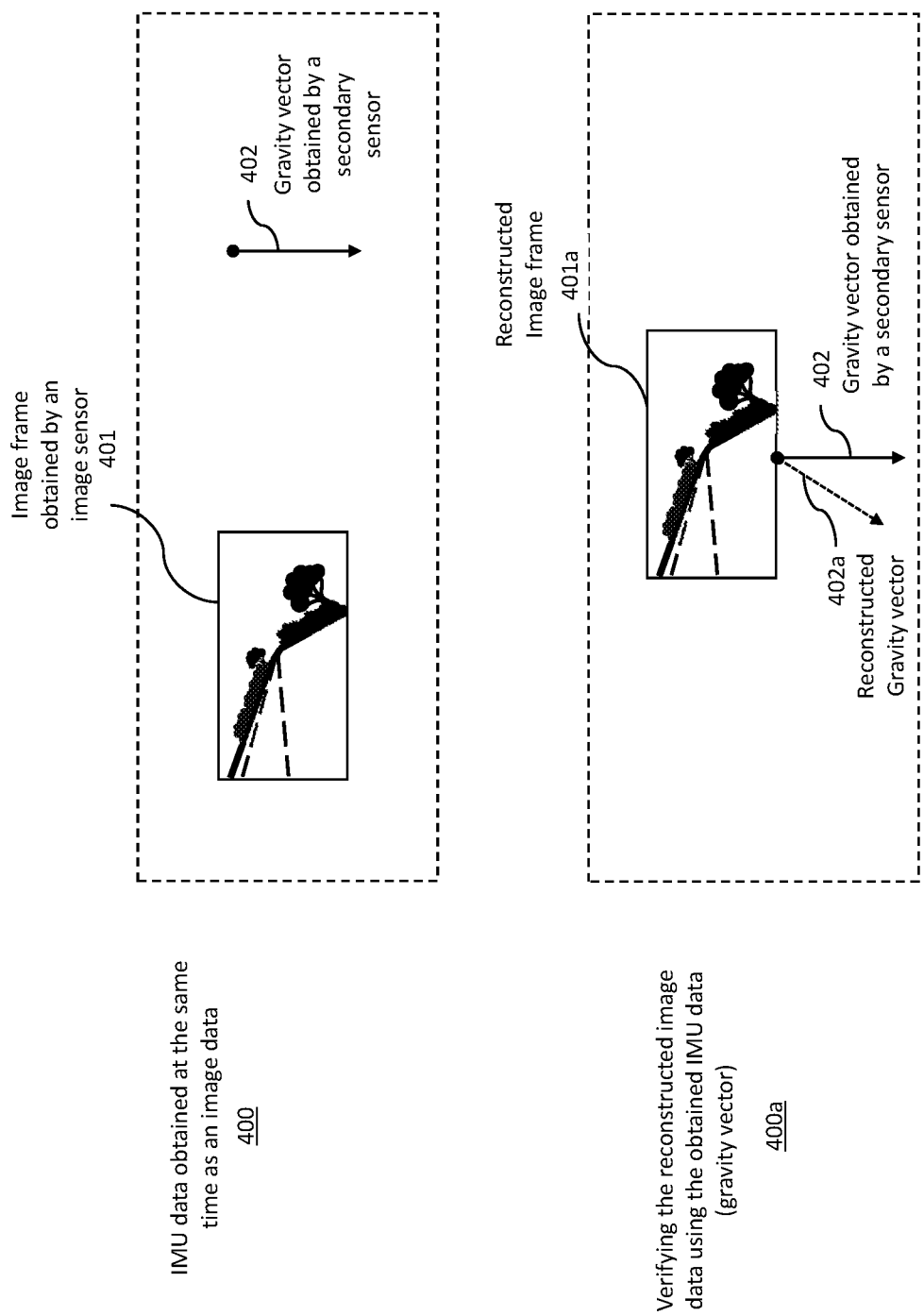
FIG. 6 illustrates a frame of image data which when correlated with IMU data indicates that the image data should be rejected from incorporation into a map as the IMU data and reconstruction from the image data do not correlate when comparing an expected gravity vector to actual values from the sensors.

Referring to FIG. 6, a visual illustration of image data 401 captured by a data gathering device and secondary IMU data 400 captured by a secondary sensor being used by the verification/validation process 305 will now be described. An image frame 401, which is captured by an image sensor, has an associated gravity vector 402 which is determined by a secondary IMU sensor. As stated previously, the secondary IMU sensor can obtain data at substantially the same time as the image sensor, or the two datasets can be synchronized. At the stage of validation 305, with pose information and gravity vectors for the frames also being reconstructed or estimated, the gravity vector 402 is compared to the reconstructed gravity vector 402a for the reconstructed image frame 401a to check whether the gravity vectors correspond to each other sufficiently. In this example, the reconstructed gravity vector 402a does not match the expected direction of the gravity vector obtained by a secondary sensor 402. This suggests the reconstruction is not accurate. Optionally, the IMU sensor provides a sequence of gravity vectors to correspond with the image data (i.e. for each image frame of the first data). In some embodiments, a reconstructed sequence of gravity vectors can also be derived from the reconstructed map which can be compared to the sequence of data obtained from the IMU sensor in order to validate the map segment. Optionally, the step of determining a correlation with the second dataset 303 comprises determining 305 whether the sequence of gravity vectors for image data 302 corresponds to or aligns with the reconstructed 304 sequential pose information relative to the sequence of gravity vectors from the secondary sensor.

A gravity vector, when applied to a sufficiently small scale such as an individual photograph of a local environment, may be assumed to be acting in a consistent direction. For example, images captured of a local urban environment may be assumed to have a gravity vector acting vertically downwards towards the center of the earth. Therefore, when generating a reconstruction 304 of the area corresponding to the new segment using data extracted or derived from the first dataset 302, a verification is performed to check the gravity vector associated with each of the incorporated images does actually act vertically to within a predetermined tolerance. If the gravity vector secondary data 303 associated with a specific part of the reconstruction 304 does not conform to this requirement within a predetermined tolerance, then the accuracy of the associated image data 302 is not sufficient 305*a* and may be discarded 307. For example, there may be an error in the image data 302 if between sequential images the gravity vector inverts or "wobbles" in a way that is substantially inconsistent with the optical movement detected between each image.

In a further embodiment, the second dataset 303 is provided by an accelerometer and/or a gyroscope that relates to data associated to the trajectory of the sequence of images 302 that are captured. For example, a sequence of images 302 that are captured along a trajectory by an accelerating vehicle will record an increasing velocity for each image frame along the trajectory. Likewise, if a sequence of images were captured along a bend in a round road, the gyroscope (second type of sensor) will record a constant angular velocity along the trajectory. This secondary sensor data can be used to verify the reconstructed data 304 produced using the original image data 302, when corresponds or aligns to the secondary data 303 recorded.

In some embodiments, the secondary sensor is an accelerometer and/or gyroscope that outputs trajectory data 303. In these embodiments, determining a correlation 305 for the second dataset 303 comprises determining whether the determined trajectory data from secondary data 303 for image data 302 correlates or aligns to the reconstructed sequential pose information 304. In other words, validating the reconstruction of the map is determined by comparing the secondary data to the reconstructed sequential pose information based on the first image data, and verifying that the reconstructed sequential pose data aligns with the secondary data. As previously stated, validating 305 can further comprise generating viewpoints of the reconstructed area based on the reconstructed map data, for example the reconstructed sequential pose information 304.

Trajectory data gathered by a sensor such as an accelerometer and/or gyroscope can provide data associated with an image to assist in the validating of image data 302 gathered in the first dataset. For example, an accelerometer can register the movement of an image sensor while one or more images are being taken 302. If this secondary data 303 records movement to the left, but the reconstructed image data 304 appears to indicate movement in contradiction with this recorded movement, then an inaccuracy may have been introduced and hence the data may be rejected 307 from inclusion into the global map. Similarly, sequential pose information can be provided as, or generated from, the second data 303 and can be used to verify an expected pose within image data 302. If the reconstructed map 304 or image data 302 does not match said one or more expectations, then the relevant image data 302 may not be sufficiently accurate 305*a* to be included as part of the global map 306.

In some embodiments, the second dataset 303 provides kinematic constraints. Optionally, the kinematic constraints may comprise a maximum velocity threshold. These are often real-world limitations or constraints that can be used to verify or validate map data. As an example, an erroneous reconstruction of map data may result in velocity data that may not have been possible to achieve in the real-world. Comparing reconstructed map data to the actual kinematic constraints can be used to determine whether the reconstructed map data aligns with or correlates to the raw data such as kinematic information. Other examples include monitoring the maximum device velocities, acceleration constrains, and in some embodiments, assessing the number of landmarks linking separate reconstructions as this is indicates the potential errors. A further example includes comparing the data collected by a stationary device to the reconstructed data derived from the data obtained by the device and verifying whether the reconstructed data corresponds to the stationary/static data captured by the device.

Static and/or kinematic constraints can also be derived from the second data 303 to verify the reconstructed data 304. For example, a vehicle may be restricted to travelling at a certain speed on a road (which can be determined from knowledge of such restrictions within a given environment, i.e. knowledge of speed limits within a road network), and the vehicle can only accelerate within real-world limits either determined from data relating to the vehicle or from the laws of Physics.

In at least some embodiments, the first dataset 302 and the second dataset 303 are captured at substantially the same time. If the two or more datasets 302, 303 are captured at substantially the same time then the image data in the first dataset 302 may be more accurately linked with the metadata or secondary sensor dataset 303, as the second dataset 303 will be synchronized with the first dataset 302. Therefore, the conditions experienced by the image sensor will correspond to the conditions of the environment as captured by the second sensor. As stated previously, in at least some embodiments, the first dataset 302 and second dataset 303 comprise sequential data.

Each section of the global map may be constructed from batches of data containing a plurality of images and comprising common data points between batches. The greater the number of common data points between batches, and hence the overlap between the neighboring map segments created from each batch, the more accurate the reconstruction of the global map may be. A greater number of data points provides a correspondingly greater number of links between each map segment, and hence the reconstruction of the global map may be performed more precisely using overlapping batches. The reconstruction process may be at least partly determined from overlapping and/or neighboring map portions with which to tie together the multiple data streams of images obtained. The image data may be obtained as multiple streams of data, described as sequential image data, data streams, or data collects.

Alternatively, in a further embodiment, any combination of sensors in addition to an image sensor can be used to generate the second dataset 303 to verify 305 the 3D reconstructed area 304. Due to the large amounts of input data that can be collected and processed with these embodiments, an entire sequence of input images or captured data for a given region of the map may be disregarded 307 if there is an inconsistency in one image frame with the rest of a sequence of images or a data of images, and replacement data can be obtained for consideration instead.

In existing SfM pipelines, the approach of segmenting maps into smaller, more manageable segments and processing these simultaneously is often used. However, this approach is not performed in a robust way especially once the segments have been processed, and these approaches still struggle to cope with large datasets being used as input data.

Figure 7A:
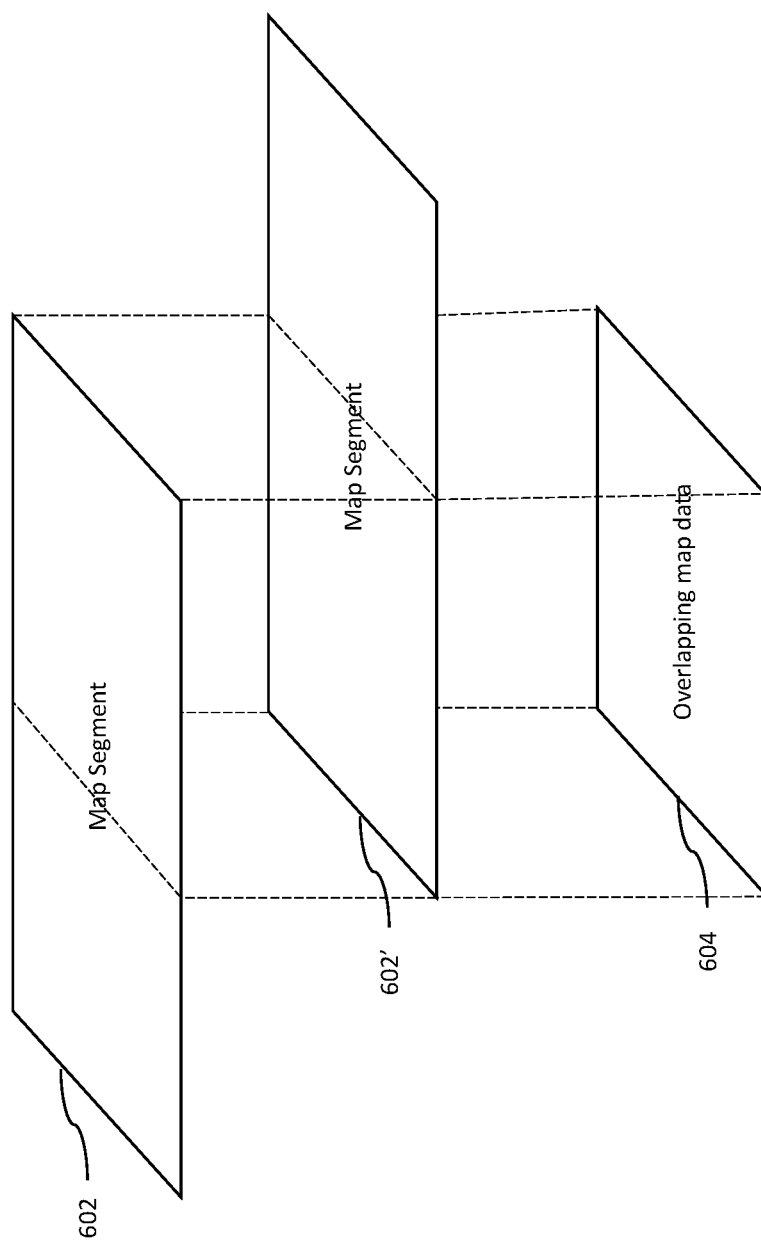

In example embodiments described herein, and with reference to FIG. 7*a* (which shows only two neighboring segments 602, 602' but the reader will appreciate that all neighboring segments 602, 602' in the global map overlap in each direction with any neighboring segments), there is provided a method for creating and/or updating a large-scale global map. In example embodiments, the general approach is to segment the global map in a way that each segment 602 substantially overlaps 604 its neighboring segments 602'. For example, the overlap 604 between neighboring map segments 602, 602' can be approximately 50%. This overlap enables parallel processing of each map segment, at substantially the same time, whilst the overlap in data between the neighboring map segments 602, 602' allows the map segments to be stitched together/aligned robustly having been processed.

As with other embodiments described herein, and with reference to FIG. 4, the input data may include a first dataset 302 comprising a set of images which can be collected by mapping vehicles, for example by using hand-held devices such as cameras or mobile phones affixed to (or otherwise placed within) a vehicle, or by using images obtained from a database. Other inputs for substantially optimal visual map creation can include, but are not limited to, associated/secondary data 303 such as satellite positioning data, and timestamp measurements. Satellite positioning data can provide a reliable and established means for defining a particular geographic area of relevance to the images captured, for example by providing a preliminary location determination for each image that can, in some embodiments, be used to determine which segment or segments of the map that image corresponds to. In other embodiments, other methods of preliminary location determination can be used, alone or together, for example: using visual odometry to estimate the position on the map associated with each image; performing reconstruction of a map portion from a collect of image data and assigning a preliminary map position to each image along the determined trajectory of the collected data. By associating satellite positioning data 303 with one or more images in the first dataset 302, an additional verification may be provided in relation to the localization of those images.

In at least one embodiment, the new segment of map data 306 is provided by a single device comprising at least one image sensor and at least one secondary sensor. In this way the image sensor and the secondary sensor, operable to provide the (first) image dataset 302 and the second dataset 303, may be integrated into a single device, for example a mobile phone with a camera. A single device may provide an efficient and secure means for collecting and collating the at least two types of datasets 302, 303. Further, if the two or more types of datasets 302, 303 are derived from a single device then the image data in the first dataset 302 may be more accurately linked or correlated with the second dataset 303 as the relevant sensors themselves may be in electronic communication with each other or have a common timestamp using the internal clock of the device on which they are housed.

Figure 8:
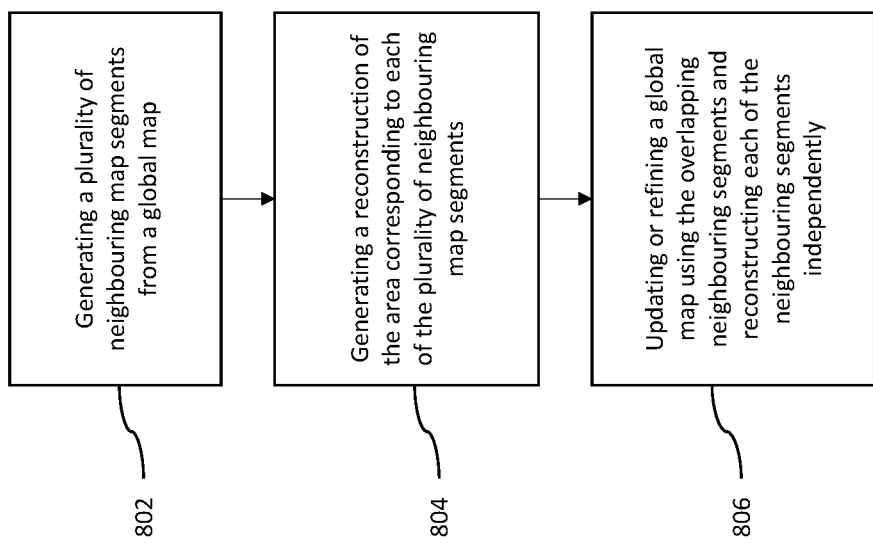
FIG. 8 is a simplified flowchart showing the steps in a process of using overlapping neighboring segments to update a global map.

Referring to FIG. 8, example embodiments seek to generate a refined global map by generating a plurality of neighboring map segments for a large-scale global map 802, where each of the plurality neighboring map segments correspond to an area of the global map or an area to be updated in or added to the global map, and further generating a reconstruction of the area corresponding to each of the plurality of neighboring map segments 804, wherein each of the plurality of neighboring map segments substantially overlaps with one or more neighboring map segments. In doing so, each map segment shares a number of data points with its neighboring map segments which can help alignment of the segments.

In example embodiments, the process of updating the global map 806 can include a step of pre-determining one or more requirements for the reconstruction of an area of the global map. In such embodiments, if the reconstruction of an area meets or satisfies these predetermined requirements it permits the global map to be updated with the reconstruction of one or more neighboring map segments meeting these requirements. In some embodiments, the reconstruction would need to be an improvement on the existing global map. This may be determined by the validation of the input data (as previously indicated) or various SfM techniques that generate more accurate map segment reconstructions based on the input image data obtained by one or more devices. In some embodiments, the predetermined requirements can be based on the data used to generate the global map, optionally in the form of one or more constraints.

According to some embodiments, there is provided a method for updating a global map 806. The global map comprises a plurality of overlapping map segments 602, 602', wherein each of the plurality of overlapping map segments 602, 602' corresponds to an area of the global map, and wherein each of the plurality of overlapping map segments 602, 602' substantially overlaps 604 with one or more neighboring map segments. The method comprises the following steps: receiving one or more input image data related to the global map; determining a relationship between the input image data and one or more of the plurality of overlapping map segments by determining which of the one or more of the plurality of overlapping map segments correspond to the one or more input image data; generating a reconstruction of at least one of the overlapping map segments corresponding to one or more input image data using the one or more images in the reconstruction; and fusing together each generated reconstruction with the one or more neighboring map segments based on overlapping map portions between each generated reconstruction and each of the one or more neighboring map segments of said generated reconstruction.

It can be difficult to robustly process the large amounts of input data needed for a global map. It can also be difficult to accurately and robustly stitch smaller map segments together after being processed. Therefore, to enable a scalable and efficient method for map generation, in some embodiments the global map may be separated into smaller more manageable overlapping map segments 602, 602' each of which may be processed independently and simultaneously, allowing new input data to be processed for each segment and then incorporated into the global map more efficiently. In some embodiments, the input data may be one or more images, or a combination of image data and secondary data.

Segmenting a larger map into smaller maps 602, 602' such that each smaller map segment 602, 602' substantially overlaps 604 one or more neighboring segments 602, 602' may allow the segments 602, 602' to be stitched together or aligned with each other robustly, in addition to allowing efficient parallel processing of each map segment 602, 602'. It should be understood that the map segments can be stitched together based on matching visual features, corresponding location data such as satellite positioning data, SfM methods or any such methods. In some embodiments, the segmented map data or reconstructed map data can be fused together based on the overlapped areas of the segments to be stitched or combined. As new input data is received, and having determined its correlating map area (e.g. within the global map), each associated individual smaller map segment may be processed or reconstructed separately, optionally using a parallel processing arrangement. In some embodiments, determining which of the overlapping map segments each of the input image data corresponds to can be based on any visual matching technique, the use of location data, and/or SfM techniques that incorporate deriving pose data as described above. Once processed, each reconstruction of the smaller map segments 602, 602' is then aligned with the other reconstructions of the smaller map segments 602, 602' with reference to the global map from which the smaller map segments were extracted/determined. The overlap 604 between each of the smaller map segments 602, 602' allows for a more accurate and robust fusing/alignment/stitching process between map segments to take place.

In at least one embodiment, the global map is updated with the reconstruction of one or more overlapping map segments 602, 602' when the reconstruction of an area meets a predetermined requirement 305a.

If the visual data corresponding to each of the map segments 602, 602' creates a reconstruction of the map segment that meets a requirement 305a, such as a predetermined quality threshold, then in at least one embodiment the image data may be assumed to be good enough to be used expand or refine the global map 306. The degree of accuracy required when considering whether the reconstruction is validated by the secondary sensor data may be used as part of the validation process depending on the required or desired accuracy of the global map, for example a predetermined percentage or value for the degree of accuracy can be used as the predetermined quality threshold.

In some embodiments, the step of generating a reconstruction of the area corresponding to each of the plurality of overlapping map segments is performed substantially simultaneously (e.g. in a parallel processing arrangement).

Having a large map broken into smaller segments 602, 602' may allow the reconstruction step to be distributed across several processing means, each processing means performing the reconstruction step for one or a portion of the segments, and this distribution may result in a more efficient use of resources. Further, if multiple processing means are available then the reconstruction process may be completed more quickly than if a single processing means were to be used.

In at least one embodiment, the step of generating reconstructions of each area corresponding to each of the plurality of overlapping map segments is performed using computer vision techniques, such as SfM techniques 108. Optionally, the step of generating a reconstruction of the area corresponding to each of the plurality of overlapping map segments comprises a reconstruction based on visual features and pose data generated from the global map.

In some embodiments, each of the plurality of overlapping map segments or reconstructions thereof comprise or have associated with them a group of images, said group of images representing a geographical area of the global map.

Image data can provide a means for reconstructing a map such that the map reflects to a predetermined level of accuracy a physical environment. The or each overlapping map segment can be reconstructed from one or more images relevant to the local environment within the bounds of that specific map segment.

In some embodiments, each of the plurality of overlapping map segments comprise one or more frustums, optionally indicative of pose data. With reference to previously described embodiments, in some embodiments, the composition of the overlapping map segments can include a number of images, each with respective pose data. This pose data can be used to enable the stitching or combining of neighboring map segments.

The capture of pose data, for example in the form of one or more frustums, can provide relevant directional information to a global map. In one embodiment each frustum, for example a square frustum, comprises two parallel faces one of which has a greater surface area than the other. The smaller face may indicate the directional information, representative of an arrow pointing towards a particular direction.

In some embodiments, the step of generating a reconstruction of the area corresponding to each of the plurality of overlapping map segments comprises reconstruction constraints. In some embodiments, these constraints comprise any one or any combination of: geographical radius, image size, number of images in each segment and number of common data points. Optionally, the common data points comprise; one or more landmarks, and/or extracted visual features. These common points can be used to properly align the overlapping map segments for the global map.

Monitoring the trajectory of the devices, for example the car on which the image sensor is mounted, can provide an additional dataset useable for reconstruction or validation, as described in other embodiments.

Referring back to FIG. 7a, as discussed above, an example embodiment is illustrated where a large map or a global map is broken into several smaller map segments 602, 602' for independent but parallel processing. Each map segment 602, 602' can have a set or batch of image data and additional sensor data or other associated meta data that corresponds to the geographical area the map segment represents. The map segments 602, 602' substantially overlap 604 one or more neighboring map segments 602, 602'. In some instances, the size of the segments 602, 602' and/or corresponding batches of data are determined dynamically.

As illustrated in FIG. 7b, there can be varying levels of overlap between the map segments. When the overlap between the map segments is low (for example at approximately 5%) 604a, stitching map segments can work well but, in some cases, can lead to inaccuracies when stitching map segments together as the common data points between neighboring map segments are relatively low. However, a very large overlap (for example at approximately 95%) 604b between the map segments can lead to unnecessary duplication of computation. Therefore, in example embodiments, the overlapping map segments 602, 602' may comprise a 50% overlap 604 with each neighboring map segments 602, 602' (or thereabouts), which can enable a balance between the number of common datapoints and efficient processing of the map segments.

In example embodiments, the step of generating a reconstruction of the area corresponding to each of the plurality of neighboring map segments can be based on visual features, such as landmarks or road signs that are observed in the images, and also using image metadata, such as pose or orientational data, which can be obtained from image sensor devices or external devices used to store such metadata.

In example embodiments, the neighboring map segments can be collected together or grouped into a particular region or area of the global map, for example a particular urban area or a section of the urban area. The neighboring map segments can collectively represent a geographical area of the global map. Map reconstruction may involve processing segments of the map that can locate or view the same scene, or parts of a scene within an image such as buildings, landmarks, and road signs, in order to reconnect and realign overlapping areas of map portions to generate a robust global map, or to further refine the global map, with substantially optimal visual redundancy. Furthermore, embodiments seek to identify images that can tie or match different portions of the map together based on correlations of, for example, location similarity, orientation similarity, and/or pose similarity.

The methods of processing as above and information from image data can be used to reconnect and realign different areas of the map together, the map being constructed from the segments built from the sequential image data that has been obtained. In example embodiments, the map portions can be realigned using constraint-based optimization with variables. Variables include, but are not limited to, poses of all of the images obtained by each mapping vehicle, and constraints include, but are not limited to, poses of images within each of the map segments and the relative pose of images within each of the map portions, geographical radius, image sizes, number of images within each of the segmentations, and number of common data points. In some embodiments, accuracy-increasing variables or constraints, or techniques such as bundle-adjustment of the global map, may also be used.

As with all embodiments herein, bundle-adjustment may be used in optimizing pose data as well as for accurate landmark localization. Bundle adjustment is described as the problem of refining a visual reconstruction to produce jointly optimal or substantially optimal 3D structures and viewing parameter (camera pose and/or calibration) estimates. In order to produce optimal or substantially optimal reconstructions, parameter estimates may be determined using a minimizing cost function that quantifies the model fitting error, for example. In some embodiments, the bundle-adjustment can produce a substantially optimal reconstruction with respect to both structure or landmark localization, and camera variations or image pose variations.

In at least some embodiments, there is provided method for updating or generating a global map, the method comprises the following steps: receiving input image data from one or more devices; selecting at least some of the input data to generate two or more batches of data corresponding to an area of the global map, each batch of data comprising: a group of images from the input data; and one or more common images comprising one or more visual features; generating a reconstruction of the area corresponding to each of the batches of data, and fusing the reconstruction of the areas using the one or more visual features from the common images.

It is often difficult to robustly process large amounts of input data to enable a scalable and efficient method of map generation. In the example embodiment, the input data, such as image data obtained by one or more devices, may be separated into smaller more manageable batches/layers which may be processed independently and simultaneously.

Converting an input dataset into one or more smaller datasets representing regions of a global map (which may also be referred to as areas, segments, sections, zones, or portions of the global map)—with each region being represented by a batch or layer of data that includes data gathered by one or more devices for that region—may allow portions of a global map to be processed and reconstructed efficiently. The input data may be processed to generate at least two batches/layers. The smaller batches may be used to provide a better-quality reconstruction of a section of the environment captured as represented by each batch of data. Each batch can be processed separately, optionally as part of a parallel processing arrangement. Once processed, each batch may then be aligned with the other batches when building/generating a larger map from the batches.

In some embodiments, the method described herein further comprises updating the global map with one or more batches of data when the reconstruction of the area meets a predetermined requirement (such as a quality threshold).

If the visual data (e.g., image data) corresponding to each of the batches are used to reconstruct a map for each batch so that the reconstructed map meets a requirement such as a quality threshold, then in at least one embodiment the visual data/reconstruction may be assumed to be good enough to expand or refine the global map (and so be incorporated into the global map). The degree of accuracy required when considering whether the reconstruction conforms to the requirements of the data may be set as a predetermined (quality/error) value according to the required accuracy of the global map. Multiple batches of data (which may be collected from different sources) that cover the same geographical area may be used to generate a reconstruction, and therefore the average reconstruction or the best quality reconstruction of the environment may be determined as the multiple datasets of that area combine to provide a richer dataset to refine or add to the global map.

In some embodiments, the step of generating a reconstruction of the area corresponding to each of the batches of data is performed independently. Optionally, the step of generating a reconstruction of the area corresponding to each of the batches of data is performed substantially simultaneously.

Having the input data broken into smaller batches of data corresponding to regions of the map may allow each reconstruction step (whereby each region of the map is reconstructed from each smaller batch of data) to be distributed across several processing means, and therefore may result in the more efficient use of resources or the more efficient/increased speed of generation of regions of the map for incorporation into the global map. Further, if multiple processing means are available then the reconstruction process may be completed more quickly than if a single processing means were to be used, as bottlenecks may be avoided through the use of parallel processing and scalable resources.

In some embodiments, the step of generating a reconstruction of the area corresponding to each of batches of data is generated using computer vision techniques. Optionally, the step of generating a reconstruction of the area corresponding to each of batches of data further comprises a reconstruction based on visual features and pose data generated from the input data. Optionally, the one or more batches of data comprises a group of images, where said group of images represent an area of the global map. Optionally, the one or more batches of data comprises one or more frustums, indicative of pose data, which is generated from the input data.

Image data may provide a means for preparing a map such that the map reflects, to a predetermined or desired level of accuracy, a physical environment. The or each batch may comprise one or more images relevant to the local environment within the bounds of that specific batch.

In some embodiments, at least two batches of data correspond to substantially the same area of the global map. Optionally, at least four batches of data correspond to substantially the same geographic area. The use of four batches, or four layers of data, covering the same, or substantially the same, environment may produce substantially optimal reconstructions.

In at least some embodiments, the step of selecting image data to generate batches and/or generating a reconstruction of the area corresponding to each of batches of data comprises a set of constraints comprising any one or more of: geographical radius, image size, number of images in each segment, number of common data point, common images or common visual features. Optionally, the common data points comprise: one or more landmarks, or visual features.

To improve the efficiency of processing map data, it may be useful to limit the properties of the one or more batches. For example, some processors may be restricted to a maximum image size (image frame size or image data) or the number of images that can be processed in one operation/batch. Similarly, the batches may be limited to a certain geographical area to control the data needed to be processed. Landmarks and/or extracted visual features, for example bodies of water or skyscrapers, can provide reliable means for reconstructing a map. Such features do not typically move, and as such can be used as links between separate batches of map data. For example, if a first batch comprises Landmark A, and a second region of a second batch also comprises Landmark A, then those points in each of the batches may be safely overlaid such that the regions comprising Landmark A are superimposed to form a single landmark. It should be understood by the reader that landmarks can be less human-recognizable regions such as a specific section of the surface area of a building for example.

In at least some embodiments, additional input data comprising any one or any combination of: GPS data, IMU sensor data or accelerometer data can be utilized to improve map generation. Optionally, the image data is gathered at various times, in varying environmental conditions along different trajectories over one or more collects.

In at least some embodiments, the image data is provided by one or more vehicles. Optionally, the batches of data comprise a visual representation of the trajectory of the one or more devices.

In at least some embodiments, bundle-adjustment is performed on the reconstruction so as to increase accuracy. Optionally, the bundle-adjustments are carried out to optimize pose data and localization landmarks between at least two batches of data.

The optimization of pose data and landmark localization, through the use of bundle-adjustment, can provide a more efficient map reconstruction process and hence reduce the computational expense of processing one or more map segments/batches.

In at least some embodiments, the reconstruction of the area comprises creating a visualization of the area in a 3D space. 3D reconstruction may provide a versatile and accurate means for a user to explore the map in a virtual environment.

In example embodiments, generating a reconstruction of the batches can be based on visual features, such as landmarks or road signs that are observed in the images, and also using additional, such as pose or orientational data, which can be obtained from image sensor devices or external devices used to store such metadata.

In example embodiments, the batches can be collected together or grouped into a particular region or area of the global map, for example a particular urban area or a section of the urban area. The batches can collectively represent a geographical area of the global map. In some embodiments, reconstruction or selecting the images to generate one or more batches of data may involve processing the batches that can locate or view the same scene, or parts of a scene within an image such as buildings, landmarks, and road signs. This also allows batches to be connected and aligned to generate a robust global map, or to further refine the global map, with substantially optimal visual redundancy. Furthermore, embodiments seek to identify images that can tie or match different portions of the map together based on correlations of, for example, location similarity, orientation similarity, and/or pose similarity.

The methods of processing as above and information from image data can be used to reconnect and realign different areas of the map together, the map being constructed from the group of images used to the batches of data. In example embodiments, the map portions can be realigned using constraint-based optimization with variables on the common images between the batches of data. Variables include, but are not limited to, poses of all of the images obtained by each mapping vehicle, and constraints include, but are not limited to, poses of images within each batch and the relative pose of images within each of the map portions, geographical radius, image sizes, number of images within each of the batches, and number of common data points or common visual features. In some embodiments, accuracy-increasing variables or constraints, or techniques such as bundle-adjustment of the global map, may also be used.

In example embodiments, combining or fusing the reconstruction of the area comprises reconstructing two or more batches of data together. The batches in this example have one or more common image data. In other examples, and as described in previous embodiments, the reconstruction of the area can also be optimized based on the visual features and pose data derived or generated from the image data.

As with all embodiments herein, bundle-adjustment may be used in optimizing pose data as well as for accurate landmark localization. As noted above, bundle adjustment is described as the problem of refining a visual reconstruction to produce jointly optimal or substantially optimal 3D structures and viewing parameter (camera pose and/or calibration) estimates. In order to produce optimal or substantially optimal reconstructions, parameter estimates may be determined using a minimizing cost function that quantifies the model fitting error, for example. In some embodiments, the bundle-adjustment can produce a substantially optimal reconstruction with respect to both structure or landmark localization, and camera variations or image pose variations.

In example embodiments, the reconstruction of each of the batches is processed independently, and in parallel, in order to improve the processing efficiency and update, refine or create a global map. Additionally, in some embodiments, the reconstruction step is carried out for each of the batches substantially simultaneously in order to create an efficient reconstruction process with low computational time.

In some example embodiments, prior knowledge of the environment may be used, such as a database of road names or landmarks, etc. in order align the map segments together. Thus, in some embodiments a navigation system or GPS data may be further implemented.

Image data obtained for processing by the data gathering devices may be in the form of a raw image or data file in order to save, with minimum loss of information, data obtained from any of the sensors (or additional sensors), and the conditions surrounding the capturing of the image, i.e. secondary data. In example embodiments, in order to convert image metadata into a photographic rendering of a scene, and then store them as a standard graphical format, processing may be carried out locally within the image sensor, or in a raw-file converter, or by using a remote method. Typically, processing image data may include, but not limited to, decoding, defective pixel removal, noise reduction, compression, optical correction, or dynamic range compression.

In embodiments, raw and/or processed image data may be stored within cloud storage (or other remote computer system), which data may then be accessed through a web service application programming interface (API) or by applications that utilize the API, such as a cloud desktop storage, a cloud storage gateway, or web-based content management systems. Typically, data may be stored locally or remotely in order to efficiently access data. For image data obtained of the real world, decryption keys may be used in order to limit the access of data and securely store the data obtained by the use of image sensors.

Figure 9:
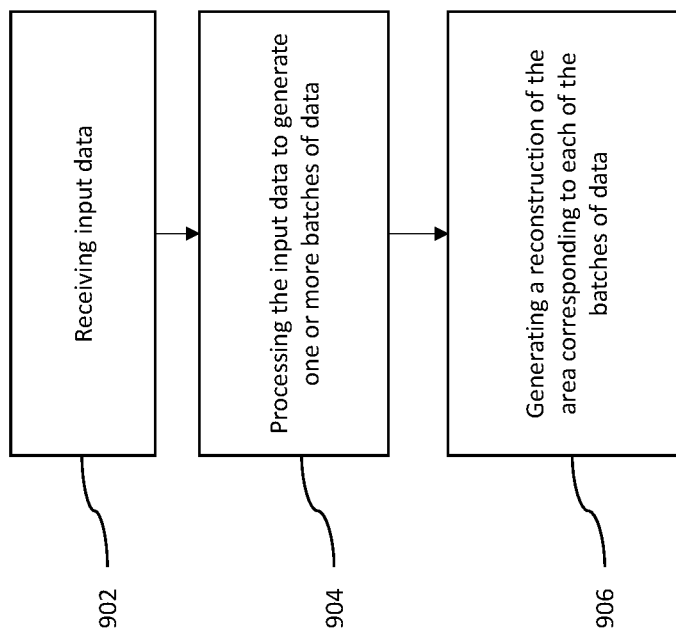
FIG. 9 is a simplified flowchart illustrating the steps in a process of creating batches of data from input data in order to create map portions for each of the batches of data.
Figure 10:
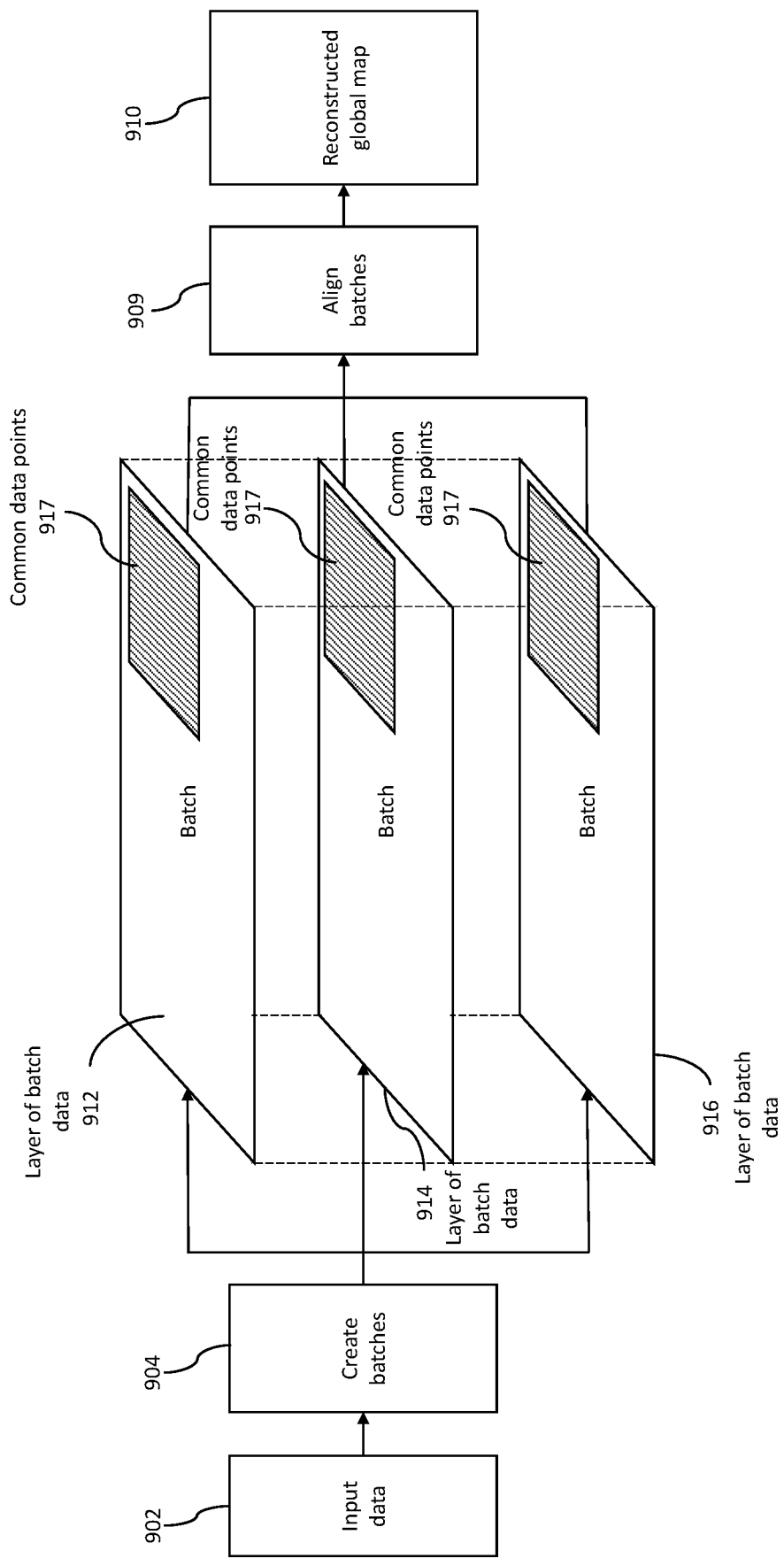
FIG. 10 is an illustration of a process of splitting input data into multiple batches where within each batch there is a subset of data common to all batches such that, when combining the map portions generated from each batch of data the subset of common data can be used to align and correlate the multiple map portions generated from the multiple batches of data.

With reference to FIGS. 9 and 10, which illustrate a further example embodiment, the input data 902, such as image data, can be used to generate 904 multiple batches of map data. In this particular context, the term batch is used to represent a "layer" (where each segment/area/zone of map data has multiple layers each representing that segment/area/zone), as seen in FIG. 10 through layers 912, 914 and 916. In example embodiments, reconstruction of the area corresponding to each of the batches of data 906 or reconstructing the global map 910 can be carried out using the reconstruction methods previously described.

In example embodiments, each map portion is typically built from different sets of image frames. "Common" images or common data points 917 are determined which can be used to tie together the multiple data streams of images obtained. The image data is obtained as multiple streams of data, described as sequential image data, data streams, or data collects, but grouped into batches of data having common data in each batch (so 1000 images may be divided into approximately four batches of 310 images where 80 images are common to all four batches and 230 images in each batch are unique to each batch).

Using, for example, four batches/layers can provide a balance between splitting the input data into too many batches and the robustness that can be gained from the number of separated batches of data per segment of the map. Each of the batches/layers contains a common subset of data per segment. Building the map segments and fusing these together is performed as normal, but for each of the multiple/four batches of separated data. Once this is done, the four sets of map segments/maps are combined together into a single output segment/map, using the common subset of data to align 909 the results from each of the batches/layers. Bundle adjustment may be performed towards the end of the process, for example as part of the alignment of the segments into one segment.

Sequential image data may be further defined as a sequence of image frames, captured over a period of time as a vehicle moves within an environment. In example embodiments, sequential image data may further be defined as an orderly set of image frames, ordered by image frames with respect to time, location, and/or enlargement or diminution of a particular scene or part of a scene observed by the imaging device. In some embodiments, each image frame may also be provided to the system with its corresponding location data for example GPS coordinates of an image frame or a group of image frames which may be used to group image data together. Sequential image data is typically segmented into approximately thirty frames per subset of image data; however, embodiments described herein may be capable of processing varying sizes of image data subsets and it can also be possible to process a varying number of image frames. Thirty image frames can be seen as an example subset size as typical paths of vehicles can be misunderstood if subset sizes are too small and may lead to confusion or duplication in categorizing subsets as straight or turns if subset sizes are too large.

The vehicle or device can be autonomous, semi-autonomous, or manually drivable. As an example, and not by way of limitation, the network environment may include multiple vehicles, third-party systems, and networks. In particular embodiments, the vehicle may be equipped with an array of sensors and a navigation system. In particular embodiments, a fleet of vehicles may be managed by management system. The fleet of vehicles, in whole or in part, may be owned by the entity associated with the transportation management system, or they may be owned by a third-party entity relative to the transportation management system. In either case, the transportation management system may control the operations of the vehicles.

In particular embodiments, the vehicles may receive data from and transmit data to a global server system and third-party systems. Examples of received data may include, e.g., instructions, new software or software updates, maps, 1D models, trained or untrained machine-learning models, location information, the vehicle itself, other vehicles, and target destinations, navigation information, traffic information, weather information, and any other suitable information. Examples of data transmitted from the vehicle may include, e.g., telemetry and sensor data, determinations/decisions based on such data, location, navigation data, and any other suitable data.

In particular embodiments, a vehicle may obtain and process sensor/telemetry data. Such data may be captured by any suitable sensors. For example, the vehicle may have a Light Detection and Ranging (LiDAR) sensor array of multiple LiDAR transceivers that are configured to rotate 360°, emitting pulsed laser light and measuring the reflected light from objects surrounding vehicle. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary.

As another example, the vehicle may have optical cameras pointing in different directions. The cameras may be used for, e.g., recognizing roads, lane markings, street signs, traffic lights, police, other vehicles, and any other visible objects of interest. To enable the vehicle to "see" at night, infrared cameras may be installed. In particular embodiments, the vehicle may be equipped with stereo vision for, e.g., spotting hazards such as pedestrians or tree branches on the road. As another example, the vehicle may have radars for, e.g., detecting other vehicles and hazards afar. Furthermore, the vehicle may have ultrasound equipment for, e.g., parking and obstacle detection. In addition to sensors enabling the vehicle to detect, measure, and understand the external world around it, the vehicle may further be equipped with sensors for detecting and self-diagnosing the vehicle's own state and condition. For example, the vehicle may have wheel sensors for, e.g., measuring velocity; GPS for, e.g., determining the vehicle's current geolocation; and inertial measurement units, accelerometers, gyroscopes, and odometer systems for movement or motion detection.

In particular embodiments, the vehicle may be equipped with a processing unit (e.g., one or more CPUs and GPUs), memory, and storage. The vehicle may thus be equipped to perform a variety of computational and processing tasks, including processing the sensor data, extracting useful information, and operating accordingly. For example, based on images captured by its cameras and a machine-vision model, the vehicle may identify particular types of objects captured by the images, such as pedestrians, other vehicles, lanes, curbs, and any other objects of interest.

In particular embodiments, the vehicle may have a navigation system responsible for safely navigating the vehicle. In particular embodiments, the navigation system may take as input any type of sensor data from, e.g., a GPS module, IMU, LiDAR sensors, optical cameras, radio frequency (RF) transceivers, or any other suitable telemetry or sensory mechanisms. The navigation system may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system may use its determinations to control the vehicle to operate in prescribed manners and to guide the vehicle to its destinations without colliding into other objects. Although the physical embodiment of the navigation system (e.g., the processing unit) appears in a particular location on the vehicle, navigation system may be located in any suitable location in or on the vehicle. Example locations for navigation system include inside the cabin or passenger compartment of the vehicle, near the engine/battery, near the front seats, rear seats, or in any other suitable location.

With reference to FIG. 11, an example computer system 1100 will now be described. In particular embodiments, the example computer system 1100 may be configured to perform one or more functions of one or more methods described or illustrated herein either alone or in combination with one or more other computer systems (which may take a similar form to computer system 1100). In particular embodiments, software running on computer system 1100 may enable computer system 1100 to perform one or more functions of one or more methods described or illustrated herein. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems may perform one or more functions of one or more methods described or illustrated herein without substantial spatial or temporal limitation. As an example, and not by way of limitation, one or more computer systems may perform in real time or in batch mode one or more functions of one or more methods described or illustrated herein. One or more computer system may perform one or more functions of one or more methods described or illustrated herein at different times or at different locations, where appropriate.

In particular embodiments, computer system 1100 includes at least one processor 1102, non-transitory computer readable media such as memory 1104 and storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing program instructions, including but not limited to program instructions for carrying out one or more functions of one or more methods described or illustrated herein. As an example and not by way of limitation, to execute program instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example, and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 that are to be operated on by computer instructions; the results of previous instructions executed by processor 1102 that are accessible to subsequent instructions or for writing to memory 1104 or storage 1106; or any other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs), be a multi-core processor, or may include multiple processing units. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example, and not by way of limitation, computer system 1100 may load instructions from storage 1106 or another source (such as another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described in further detail below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may also include multiple memory units, where appropriate. Although this disclosure describes and illustrates particular memory, this disclosure contemplates any suitable memory.

In particular embodiments, storage 1106 includes storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may also include multiple storage units. Although this disclosure describes and illustrates particular storage, this disclosure contemplates any suitable storage.

In particular embodiments, I/O interface 1108 includes hardware or software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may also include multiple I/O interface units, where appropriate. Although this disclosure describes and illustrates a particular I/O interface, this disclosure contemplates any suitable I/O interface.

In particular embodiments, communication interface 1110 includes hardware or software, or both providing one or more interfaces for communication (such as, for example, packet-based communication) between computer system 1100 and one or more other computer systems (or other network devices) via one or more networks. As an example and not by way of limitation, communication interface 1110 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1110 for any of these networks, where appropriate. Communication interface 1110 may also include multiple communication interface units, where appropriate. Although this disclosure describes and illustrates a particular communication interface, this disclosure contemplates any suitable communication interface.

In particular embodiments, bus 1112 includes hardware or software, or both coupling components of computer system 1100 to each other. As an example and not by way of limitation, bus 1112 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may also include multiple bus units, where appropriate. Although this disclosure describes and illustrates a particular bus, this disclosure contemplates any suitable bus or interconnect.

The computing entities may be communicatively connected over any suitable network. As an example and not by way of limitation, one or more portions of network may include an ad hoc network, an extranet, a virtual private network (VPN), a LAN, a wireless LAN (WLAN), a WAN, a wireless WAN (WWAN), a MAN, a portion of the Internet, or a combination of any of the above. In particular embodiments, any suitable network arrangement and protocol enabling the computing entities to communicate with each other may be used. This disclosure contemplates any suitable transmission links 650, including, e.g., wire connections (e.g., USB, Lightning, Digital Subscriber Line (DSL)

or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof.

Example embodiments may include one or more server computers. Each server may be a unitary server or a distributed server spanning multiple computers or multiple data centers. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server.

Example embodiments may include one or more data stores. The data stores may be used to store various types of information, historical information, third-party information, or any other suitable type of information. In particular embodiments, the information stored in the data stores may be organized according to specific data structures. In some embodiments, each data store may be a relational, columnar, correlation, or any other suitable type of database system. Although this disclosure describes or illustrates particular types of databases, this disclosure contemplates any suitable types of databases. Some embodiments may further provide interfaces that enable a user to process, transform, manage, retrieve, modify, add, or delete the information stored in the data store.

In embodiments, raw and/or processed image data may be stored within a cloud storage which may be accessed through a web service API or by applications that utilize the API, such as a cloud desktop storage, a cloud storage gateway, or web-based content management systems. Typically, data may be stored locally or remotely in order to efficiently access data. For image data obtained of the real world, decryption keys may be used in order to limit the access of data and securely store the data obtained by the use of image sensors.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more functions of the methods described herein, where appropriate. Although this disclosure describes and illustrates particular functions of certain methods as occurring in a particular order, this disclosure contemplates any suitable functions of the methods occurring in any suitable order or in any combination which may include all, some, or none of the functions of the methods. Furthermore, although this disclosure may describe and illustrate particular components, devices, or systems carrying out particular functions of a method, this disclosure contemplates any suitable combination of any suitable components, devices, or systems carrying out any suitable functions of the method. It should be appreciated that there can be additional, fewer, or alternative steps performed in similar or alternative orders, or in parallel, within the scope of the various embodiments discussed herein unless otherwise stated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

We claim:
1. A computer-implemented method comprising:
receiving image data captured from one or more devices;
based on the image data, generating at least two batches of data corresponding to an area of a global map, wherein each batch of data comprises:

a respective group of images from the received image data; and
one or more common images comprising one or more common visual features, wherein the one or more common images are common across the at least two batches of data;
generating a first reconstruction of the area of the global map based on a first batch of the at least two batches of data;
generating a second reconstruction of the area of the global map based on a second batch of the at least two batches of data; and
fusing the first and second reconstructions of the area of the global map using the one or more common visual features from the one or more common images.

2. The computer-implemented method of claim 1, further comprising:
updating the global map with one or more of (i) one or more of the at least two batches of data when each of the first and second reconstructions of the area meets a predetermined quality threshold requirement, (ii) one or both of the first or second reconstructions of the area of the global map, or (iii) the fused first and second reconstructions of the area of the global map.

3. The computer-implemented method of claim 1, wherein generating the first reconstruction of the area of the global map and generating the second reconstruction of the area of the global map comprises:
generating the first and second reconstructions independently in parallel.

4. The computer-implemented method of claim 1, wherein:
generating the first reconstruction of the area of the global map based on the first batch of the at least two batches of data comprises:
optimizing the first reconstruction based on first visual features and first pose data generated from the image data; and
generating the second reconstruction of the area of the global map based on the second batch of the at least two batches of data comprises:
optimizing the second reconstruction based on second visual features and second pose data generated from the image data.

5. The computer-implemented method of claim 1, wherein each of the at least two batches of data comprises one or more poses generated from the image data.

6. The computer-implemented method of claim 1, wherein the image data comprises one or more image data collects.

7. The computer-implemented method of claim 1, wherein generating the at least two batches of data comprises:
applying a set of constraints comprising one or more of (i) geographical radius, (ii) image size, (iii) number of images in each batch, or (iv) number of common images.

8. The computer-implemented method of claim 1, wherein the one or more common visual features comprise one or more landmarks represented in the image data.

9. The computer-implemented method of claim 1, wherein the image data is gathered at various times and in varying environmental conditions.

10. The computer-implemented method of claim 1, wherein the image data is provided by one or more vehicles over one or more trajectories enabling each of the at least two batches of data to comprise a variety of image data corresponding to the same area of the global map.

11. The computer-implemented method of claim 1, wherein each of the at least two batches of data comprises a visual representation of one or more trajectories of the one or more devices.

12. The computer-implemented method of claim 1, further comprising:
performing bundle-adjustments on the first and second reconstructions to optimize pose data and localization landmarks between the at least two batches of data.

13. The computer-implemented method of claim 1, wherein each of the first and second reconstructions of the area of the global map comprises a visualization of the area in a 3D space.

14. A computing system comprising:
at least one processor;
a non-transitory computer-readable medium; and
program instructions stored on the non-transitory computer-readable medium that are executable by the at least one processor such that the computing system is configured to perform functions comprising:
receiving image data captured from one or more devices;
based on the image data, generating at least two batches of data corresponding to an area of a global map, wherein each batch of data comprises:
a respective group of images from the received image data; and
one or more common images comprising one or more common visual features, wherein the one or more common images are common across the at least two batches of data;
generating a first reconstruction of the area of the global map based on a first batch of the at least two batches of data;
generating a second reconstruction of the area of the global map based on a second batch of the at least two batches of data; and
fusing the first and second reconstructions of the area of the global map using the one or more common visual features from the one or more common images.

15. The computing system of claim 14, wherein the image data is gathered at various times and varying environmental conditions.

16. The computing system of claim 14, wherein the image data is provided by one or more vehicles over one or more trajectories enabling each of the at least two batches of data to comprise a variety of image data corresponding to the same area of the global map.

17. The computing system of claim 14, wherein:
generating the first reconstruction of the area of the global map based on the first batch of the at least two batches of data comprises:
optimizing the first reconstruction based on first visual features and first pose data generated from the image data; and
generating the second reconstruction of the area of the global map based on the second batch of the at least two batches of data comprises:
optimizing the second reconstruction based on second visual features and second pose data generated from the image data.

18. The computing system of claim 14, wherein generating the first reconstruction of the area of the global map and generating the second reconstruction of the area of the global map comprises:

generating the first and second reconstructions independently in parallel.

19. A non-transitory computer-readable medium comprising program instructions stored thereon that, when executed by at least one processor of a computing system, cause the computing system to perform functions comprising:
- receiving image data captured from one or more devices;
- based on the image data, generating at least two batches of data corresponding to an area of a global map, wherein each batch of data comprises:
  - a respective group of images from the received image data; and
  - one or more common images comprising one or more common visual features, wherein the one or more common images are common across the at least two batches of data;
- generating a first reconstruction of the area of the global map based on a first batch of the at least two batches of data;
- generating a second reconstruction of the area of the global map based on a second batch of the at least two batches of data; and
- fusing the first and second reconstructions of the area of the global map using the one or more common visual features from the one or more common images.

20. The non-transitory computer-readable medium of claim 19, wherein generating the first reconstruction of the area of the global map and generating the second reconstruction of the area of the global map comprises
generating the first and second reconstructions independently in parallel.

* * * * *